(12) United States Patent
Liao et al.

(10) Patent No.: US 11,321,423 B2
(45) Date of Patent: May 3, 2022

(54) OPERATION ACCELERATOR

(71) Applicant: HUAWEI TECHNOLOGIES CO., LTD., Guangdong (CN)

(72) Inventors: Heng Liao, Shanghai (CN); Hu Liu, Shenzhen (CN); Hao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/736,427

(22) Filed: Jan. 7, 2020

(65) Prior Publication Data

US 2020/0142949 A1 May 7, 2020

Related U.S. Application Data

(63) Continuation of application No. PCT/CN2018/078407, filed on Mar. 8, 2018.

(30) Foreign Application Priority Data

Jul. 7, 2017 (CN) .......................... 201710553286.X

(51) Int. Cl.
*G06F 17/16* (2006.01)
*G06F 7/50* (2006.01)
*G06F 7/523* (2006.01)

(52) U.S. Cl.
CPC ................. *G06F 17/16* (2013.01); *G06F 7/50* (2013.01); *G06F 7/523* (2013.01)

(58) Field of Classification Search
CPC .......... G06F 7/50; G06F 7/523; G06F 7/5443; G06F 17/15; G06F 17/153; G06F 17/16; G06N 3/04; G06N 3/063
See application file for complete search history.

(56) References Cited

U.S. PATENT DOCUMENTS

2011/0307685 A1  12/2011  Song
2014/0365548 A1  12/2014  Mortensen
2018/0173676 A1*  6/2018  Tsai ........................ G06F 17/16

FOREIGN PATENT DOCUMENTS

CN  101980182 A  2/2011
CN  102662623 A  9/2012
(Continued)

OTHER PUBLICATIONS

W.M Jose et al., Algorithm-oriented design of efficient many-core architectures applied to dense matrix multiplication, Analog Integr Circ Sig Process (2015) (Year: 2015).*

(Continued)

*Primary Examiner* — Emily E Larocque
(74) *Attorney, Agent, or Firm* — James Anderson Harrison

(57) ABSTRACT

The present application is in the field of data calculation technologies, and discloses an operation accelerator, to reduce time for performing a multiplication operation on two N*N matrices. The operation accelerator includes: a first memory, a second memory, an operation circuit, and a controller. The operation circuit performs data communication with the first memory and the second memory by using a bus. The operation circuit is configured to: extract matrix data from the first memory and the second memory, and perform a multiplication operation. The controller is configured to control, according to a preset program or instruction, the operation circuit to complete the multiplication operation. The operation accelerator is configured to perform a multiplication operation on two matrices.

13 Claims, 20 Drawing Sheets

(56) References Cited

FOREIGN PATENT DOCUMENTS

| CN | 104238993 | A | 12/2014 |
|---|---|---|---|
| CN | 104391820 | A | 3/2015 |
| CN | 104899182 | A | 9/2015 |
| CN | 105589677 | A | 5/2016 |
| EP | 2728462 | A2 | 5/2014 |
| JP | S6131308 | A | 2/1986 |
| JP | S61150067 | A | 7/1986 |
| JP | H01316872 | A | 12/1989 |
| JP | 2012133793 | A | 7/2012 |
| WO | 2016186801 | A1 | 11/2016 |

OTHER PUBLICATIONS

J. Zhang et al., Improving the Performance of OpenCL-based FPGA Accelerator for Convolutional Neural Network, FPGA '17, ACM, Feb. 2017 (Year: 2017).*

Ljeoma Anarado et al. Highly-Reliable Integer Matrix Multiplication via Numerical Packing, 2013 IEEE, pp. 19-24.

Zhang Rui et al.An Optical Computing System with Performing Binary Vector-Matrix Multiplication, ,Computer Technology and Development,vol. 17,No. 10, Oct. 2007. total 3 pages. With English abstract.

Quan Huiyun:"An Introduction to Parallel Computer Programming", Wuhan University Press. Mar. 1996. total 14 pages. With English abstract.

Anonymous:"Convolutional Neural Networks (CNNs / ConvNets)", Retrieved from the internet: https://cs231n.github.io/convolutional-networks/, on May 19, 2020. total 25 pages.

Jialiang Zhang et al: Improving the Performance of OpenCL-based FPGA Accelerator for Convolutional Neural Network, Proceedings of The 2017 ACM/SIGDA International Symposium on Field-Programmable Gate Arrays, FPGA, Feb. 22, 2017 (Feb. 22, 2017), total 10 pages, XP055521756.

Jiantao Qiu et al: Going Deeper with Embedded FPGA Platform for Convolutional Neural Network, Proceedings of The 2016 ACM/SIGDA International Symposium on Field-Programmable Gate Arrays, FPGA, Feb. 21, 2016 (Feb. 21, 2016), pp. 26-35, XP055423746.

Chen Zhang et al:"Optimizing FPGA-based Accelerator Design for Deep Convolutional Neural Networks", FPGA 15, Feb. 22 24, 2015, pp. 161-170. XP055265150.

* cited by examiner $$\begin{bmatrix} A_{11} & A_{12} & \cdots & A_{1N} \\ A_{21} & A_{22} & \cdots & A_{2N} \\ \vdots & \vdots & \ddots & \vdots \\ A_{M1} & A_{M2} & \cdots & A_{MN} \end{bmatrix} \begin{bmatrix} B_{11} & B_{12} & \cdots & B_{1K} \\ B_{21} & B_{22} & \cdots & B_{2K} \\ \vdots & \vdots & \ddots & \vdots \\ B_{N1} & B_{N2} & \cdots & B_{NK} \end{bmatrix} = \begin{bmatrix} \sum_{j=1}^{N} A_{1j}B_{j1} & \sum_{j=1}^{N} A_{1j}B_{j2} & \cdots & \sum_{j=1}^{N} A_{1j}B_{jK} \\ \sum_{j=1}^{N} A_{2j}B_{j1} & \sum_{j=1}^{N} A_{2j}B_{j2} & \cdots & \sum_{j=1}^{N} A_{2j}B_{jK} \\ \vdots & \vdots & \ddots & \vdots \\ \sum_{j=1}^{N} A_{Mj}B_{j1} & \sum_{j=1}^{N} A_{Mj}B_{j2} & \cdots & \sum_{j=1}^{N} A_{Mj}B_{jK} \end{bmatrix}$$

Matrix A  Matrix B  Matrix C

FIG. 4
Prior Art

| I0 | I1 | I2 | I3 | I4 | 0 | 0 | 0 |
| I5 | I6 | I7 | I8 | I9 | 0 | 0 | 0 |
| I10 | I11 | I12 | I13 | I14 | 0 | 0 | 0 |
| I15 | I16 | I17 | I18 | I19 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

A 4*5 matrix is reshaped to an 8*8 matrix through padding

| W0 | W1 | W2 | W3 | W4 | W5 | W6 | W7 |
| W8 | W9 | W10 | W11 | W12 | W13 | W14 | W15 |
| W16 | W17 | W18 | W19 | W20 | W21 | W22 | W23 |
| W24 | W25 | W26 | W27 | W28 | W29 | W30 | W31 |
| W32 | W33 | W34 | W35 | W36 | W37 | W38 | W39 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

A 5*8 matrix is reshaped to an 8*8 matrix through padding

FIG. 18

$$A = \begin{bmatrix} A_{11} & A_{12} & A_{13} & A_{14} & A_{15} & 0 \\ A_{21} & A_{22} & A_{23} & A_{24} & A_{25} & 0 \\ A_{31} & A_{32} & A_{33} & A_{34} & A_{35} & 0 \\ A_{41} & A_{42} & A_{43} & A_{44} & A_{45} & 0 \\ 0 & 0 & 0 & 0 & 0 & 0 \\ 0 & 0 & 0 & 0 & 0 & 0 \end{bmatrix} \quad B = \begin{bmatrix} B_{11} & B_{12} & B_{13} & B_{14} & 0 & 0 \\ B_{21} & B_{22} & B_{23} & B_{24} & 0 & 0 \\ B_{31} & B_{32} & B_{33} & B_{34} & 0 & 0 \\ B_{41} & B_{42} & B_{43} & B_{44} & 0 & 0 \\ B_{51} & B_{52} & B_{53} & B_{54} & 0 & 0 \\ 0 & 0 & 0 & 0 & 0 & 0 \end{bmatrix}$$

With labels: A1, B1, C1, D1 for the four quadrants of A; A2, B2, C2, D2 for the four quadrants of B.

FIG. 19

OPERATION ACCELERATOR

CROSS-REFERENCE TO RELATED APPLICATIONS

This application is a continuation of International Application No. PCT/CN2018/078407, filed on Mar. 8, 2018, which claims priority to Chinese Patent Application No. 201710553286.X, filed on Jul. 7, 2017. The disclosures of the aforementioned applications are hereby incorporated by reference in their entireties.

TECHNICAL FIELD

This application relates to the field of data calculation technologies, and in particular, to an operation accelerator.

BACKGROUND

Currently, a product of two matrices A and B may be calculated in either of the following two manners:

Manner 1: Calculation is performed by using a vector processor.

It is assumed that C=A×B, and the vector processor can calculate M elements at the same time. Referring to FIG. 1, the vector processor loads vectors (including elements $A_{i1}$, $A_{i2}, \ldots, A_{i(M-1)}$, and $A_{iM}$) in a row i of the matrix A to a source register Reg0, and then loads vectors (including elements $B_{j1}, B_{j2}, \ldots, B_{j(M-1)}$, and $B_{jM}$) in a row j of the matrix B to a register Reg1, to multiply corresponding elements in Reg0 and Reg1; and finally, the vector processor completes an accumulate operation by using an adder tree, and calculates data $C_{ij}$ in a row i and a column j of a matrix C. After a plurality of calculations, the matrix C may be obtained.

Manner 2: To further increase a calculation speed, a multiplication operation of the matrices may be completed by using a two-dimensional computation array.

For example, the two-dimensional computation array may be an N*N systolic array. An operation of multiplying one vector and one matrix may be completed in each clock cycle by using one such systolic array.

In Manner 1, N^3 multiplication operations are required to complete a multiplication operation of two N*N matrices, and because the vector processor may multiply the M elements in each clock cycle, duration required for completing one multiplication operation is N^3/M clock cycles. In Manner 2, N^3 multiplication operations are required to complete a multiplication operation of two N*N matrices, and because the systolic array has N^2 operation units, duration required for completing one matrix operation is N^3/N^2=N clock cycles. In both Manner 1 and Manner 2, it takes a long time to complete the multiplication operation of the N*N matrices.

SUMMARY

Embodiments of this application provide an operation accelerator, to reduce time for performing a multiplication operation on two N*N matrices.

To achieve the foregoing objective, the embodiments of this application provide the following technical solutions:

According to a first aspect, an operation accelerator is provided. The operation accelerator includes: a first memory, configured to store a first matrix, where the first matrix is an M*N matrix; a second memory, configured to store a second matrix, where the second matrix is an N*K matrix; an operation circuit connected to the first memory and the second memory, where the operation circuit includes a matrix multiplying circuit and an adder circuit; the matrix multiplying circuit includes M operation groups including operation blocks, each operation group includes K operation blocks, each operation block includes N operation units, the operation unit is provided with two inputs that are respectively used to receive data sent by the first memory and the second memory, and the operation unit multiplies the two pieces of data; and the adder circuit is configured to add calculation results of operation units belonging to a same operation block to obtain a calculation result of each operation block; and a controller connected to the operation circuit, where the controller is configured to perform the following actions: respectively writing K column vectors of the second matrix into the K operation blocks of each operation group, where a $j^{th}$ piece of data in a $g^{th}$ column of vectors of the second matrix is written into a $j^{th}$ operation unit in a $g^{th}$ operation block in the K operation blocks; respectively sending M row vectors of the first matrix to the M operation groups, where an $i^{th}$ row vector of the first matrix is sent to an $i^{th}$ operation group in the M operation groups, and a $j^{th}$ operation unit in each operation block in the $i^{th}$ operation group receives a $j^{th}$ piece of data in the $i^{th}$ row vector; so that each operation unit in the M operation groups performs a multiplication operation on two pieces of data received by the operation unit, and the adder circuit adds calculation results of operation units in each operation block to obtain a third matrix, where the third matrix is a product of the first matrix and the second matrix, an element in a row i and a column g in the third matrix is a calculation result of a $g^{th}$ operation block in the $i^{th}$ operation group, M, N, and K are integers greater than 0, i is an integer greater than 0 and less than M+1, g is an integer greater than 0 and less than K+1, and j is an integer greater than 0 and less than N+1.

In the method provided in the first aspect, because the M operation groups include M*N*K operation units, the operation accelerator may perform M*N*K multiplication operations within one clock cycle. In this case, the operation accelerator may calculate a product of an M*N matrix and an N*K matrix. Compared with the prior art, this method can greatly reduce time required by the matrix multiplication operation.

In a possible design, the adder circuit includes M*K adder trees, one adder tree is corresponding to one operation block, the adder tree is connected to N operation units in the corresponding operation block, and the adder tree is configured to add calculation results of the N operation units connected to the adder tree.

In this possible design, a composition structure of the adder circuit is specifically provided.

In a possible design, the operation unit includes: a storage unit, configured to store data written into the storage unit; and a multiplying circuit connected to the storage unit, configured to calculate a product of received data and the data stored in the storage unit.

In this possible design, a composition structure of the operation unit is specifically provided.

In a possible design, the operation unit includes a plurality of storage units, a multiplying circuit, a first selection circuit connected to the plurality of storage units, and a second selection circuit connected to the plurality of storage units and the multiplying circuit. The plurality of storage units are configured to store data; the first selection circuit is configured to: before the multiplying circuit performs a multiplication operation, select, from the plurality of storage units, a storage unit for storing data used when the multiplying circuit performs the multiplication operation; the second selection circuit is configured to: when the multiplying circuit performs the multiplication operation, select a storage unit for storing data used when the multiplying circuit performs the multiplication operation; and the multiplying circuit is configured to calculate a product of received data and the data stored in the storage unit selected by the second selection circuit.

In this possible design, the storage unit may be divided into two blocks (block). When the operation unit includes a plurality of storage units, if the operation unit performs a multiplication operation based on data in one block in one storage unit, the controller may further write data into another storage unit in the plurality of storage units or another block in the storage unit that participates in the multiplication operation, thereby improving work efficiency of the operation unit.

In a possible design, the first memory is connected to the operation circuit by using a first bus, and a bit width of the first bus is $W_i*N*M$; the second memory is connected to the operation circuit by using a second bus, and a bit width of the second bus is $W_i*N$; and $W_i$ is a maximum bit width that is of input data and that is allowed by the operation unit.

In a possible design, the operation accelerator further includes a storage unit access controller connected to the first memory, the second memory, and the controller, and the storage unit access controller is configured to: obtain, under control of the controller, the first matrix and the second matrix, save the first matrix to the first memory, and save the second matrix to the second memory.

In a possible design, the operation accelerator further includes: a third memory, configured to store source data of the first matrix; a storage unit access controller connected to the first memory, the second memory, the third memory, and the controller, where the storage unit access controller is configured to: obtain, under control of the controller, the source data of the first matrix and the second matrix, save the source data of the first matrix to the third memory, and save the second matrix to the second memory; and a vector calculation unit connected to the first memory, the third memory, and the controller, where the vector calculation unit is configured to: convert, under control of the controller, the source data of the first matrix into the first matrix, and save the first matrix to the first memory.

In this possible design, the operation accelerator further has a capability of obtaining the first matrix by using the source data of the first matrix.

In a possible design, the third memory is connected to the operation circuit, and the third memory is further configured to store the third matrix.

In a possible design, the operation accelerator further includes an accumulator connected to the operation circuit, the vector calculation unit, and the controller, where the accumulator is configured to add elements at corresponding positions in the third matrix and a fourth matrix under control of the controller, to obtain a fifth matrix; and the vector calculation unit is further configured to save the fifth matrix to the third memory under control of the controller, where the third matrix is a product of the first matrix and the second matrix, the first matrix includes a first part of a first to-be-calculated matrix, the first part of the first to-be-calculated matrix is elements in $1^{st}$ to $N^{th}$ columns of the first to-be-calculated matrix, the second matrix is a first part of a second to-be-calculated matrix, the first part of the second to-be-calculated matrix is elements in $1^{st}$ to $N^{th}$ rows of the second to-be-calculated matrix, the first to-be-calculated matrix includes M rows of elements, the second to-be-calculated matrix includes K columns of elements, the fourth matrix is a product of a second part of the first to-be-calculated matrix and a second part of the second to-be-calculated matrix, the second part of the first to-be-calculated matrix is a part other than the first part in the first to-be-calculated matrix, and the second part of the second to-be-calculated matrix is a part other than the first part in the second to-be-calculated matrix.

In a possible design, the operation accelerator further includes: an instruction fetch buffer connected to the controller, and configured to store an instruction used by the controller; and a bus interface unit connected to the instruction fetch buffer, the storage unit access controller, and an external memory, used by the instruction fetch buffer to obtain the instruction from the external memory, and further used by the storage unit access controller to obtain at least one of the source data of the first matrix, the first matrix, and the second matrix from the external memory.

BRIEF DESCRIPTION OF DRAWINGS

FIG. 4 is a schematic diagram of a method for performing a multiplication operation on two matrices in the prior art;

FIG. 18 is a schematic diagram of a padding matrix according to an embodiment of the present invention;

FIG. 19 is a schematic diagram of partitioned matrices according to an embodiment of the present invention;

DESCRIPTION OF EMBODIMENTS

The following describes the technical solutions in the embodiments of this application with reference to the accompanying drawings in the embodiments of this application. In the description of this application, unless otherwise stated, "/" means or, for example, A/B may indicate A or B, and "a plurality of" means two or more.

An operation accelerator provided in the embodiments of the present invention may be applied to fields such as machine learning, deep learning, and a convolutional neural network, or may be applied to fields such as digital image processing and digital signal processing, or may be applied to other fields related to a matrix multiplication operation.

In recent years, due to good performance of a convolutional neural network in image classification, image recognition, audio recognition, and other related fields, the convolutional neural network becomes a research and development hotspot in the academic and industrial circles. The convolutional neural network mainly includes convolution and fully connected (fully connected, FC for short) operations. A computation amount of the convolution operation can usually occupy more than 70% of a computation amount of an entire network. The operation accelerator provided in the embodiments of the present invention may perform the convolution operation and the FC operation in the convolutional neural network.

Figure 1:
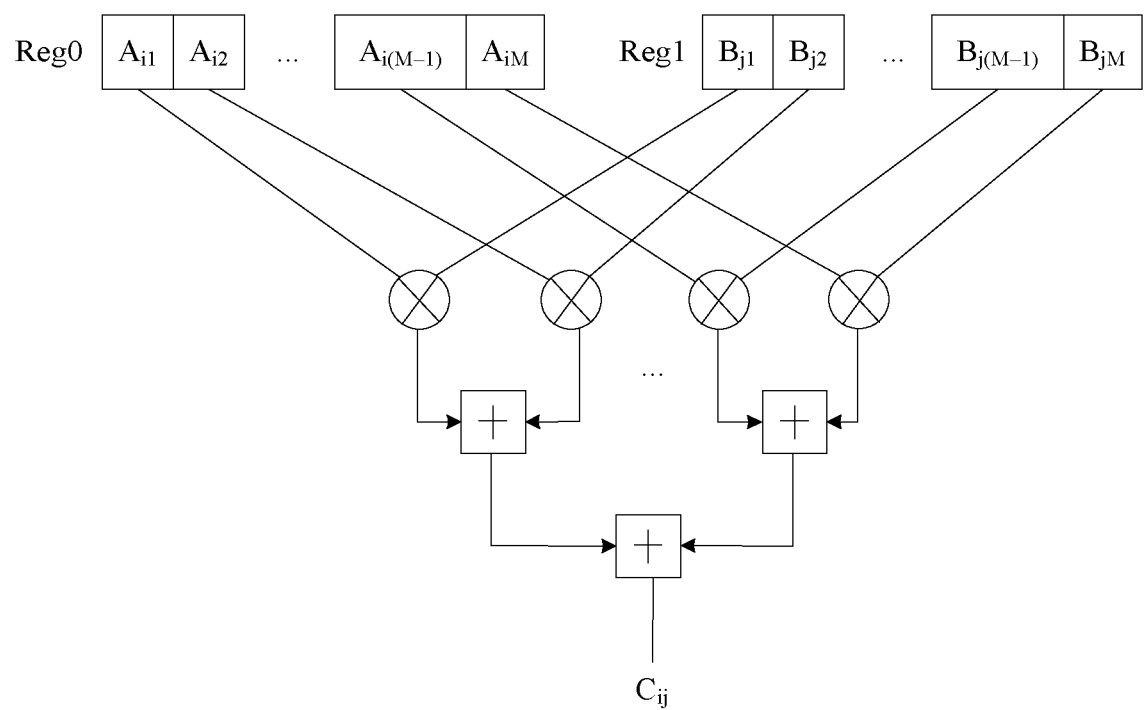
FIG. 1 is a schematic diagram of a process of calculating a product of two matrices in the prior art.
Figure 2:
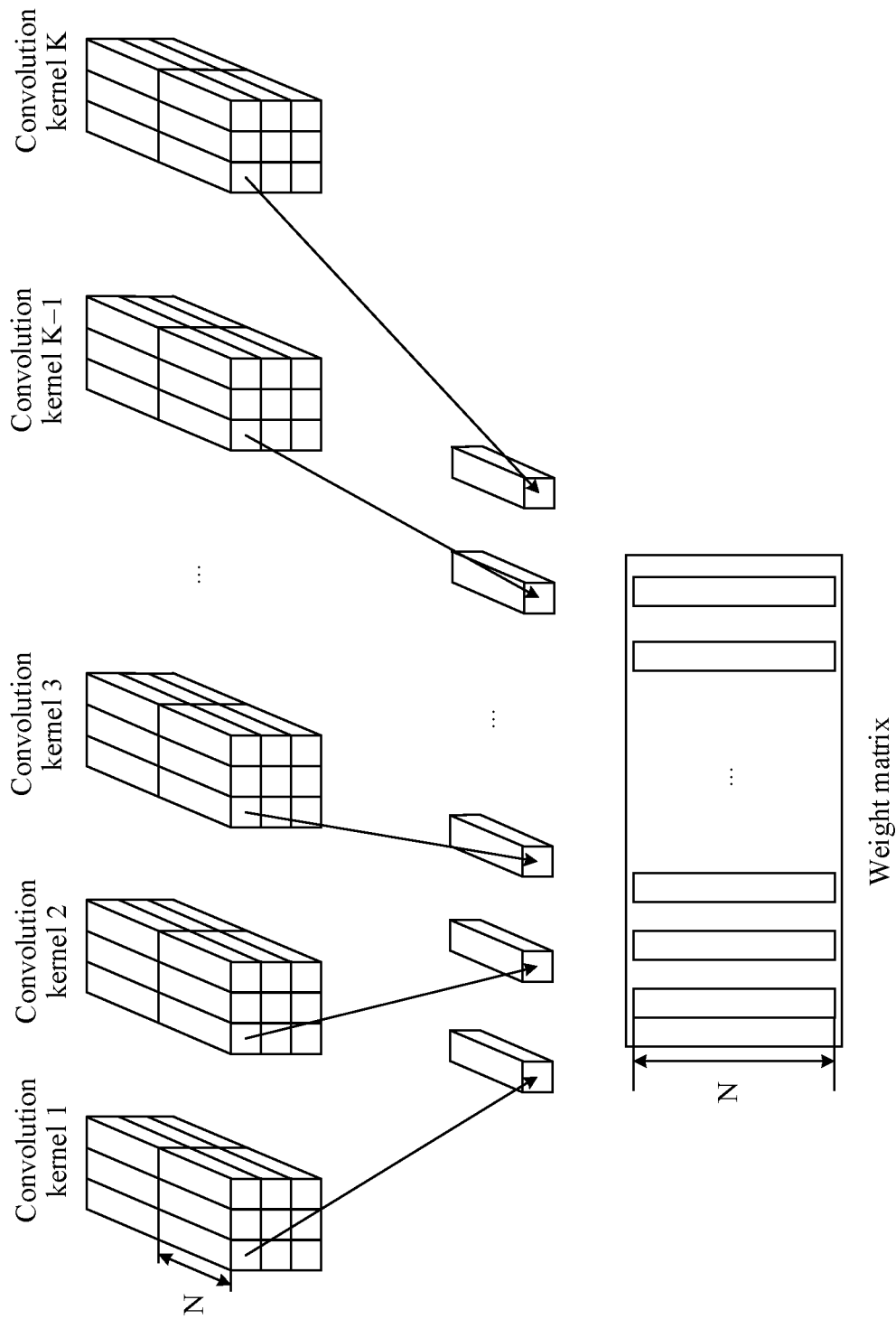
FIG. 2 is a schematic diagram of converting a convolution kernel into a weight matrix in the prior art.

The convolution operation is not equivalent to the matrix multiplication operation in the strict sense. However, the convolution operation may be converted into the matrix multiplication operation through proper data adjustment. There are usually a plurality of convolution kernels in the convolutional neural network. The convolution kernel is three-dimensional and includes three dimensions of data. Directions x and y are length and width of the data, and a direction z may be considered as depth of the data. The convolution kernels are actually filters (filter), and are mainly configured to extract different features from images. Referring to FIG. 2, the convolution kernel is substantially a combination of a series of weights. It is assumed that there are K convolution kernels. N elements in the direction z at a same position in the K convolution kernels are extracted, and an N*K weight matrix (weight matrix) can be obtained. The convolution kernels may be prestored in a memory of the operation accelerator in a form of a weight matrix based on a specification (to be specific, a row quantity and a column quantity of the matrix that can be calculated by the operation accelerator) of the operation accelerator, for calling when the operation accelerator performs a matrix multiplication operation. In the embodiments of the present invention, "*" indicates "multiplying".

Figure 3:
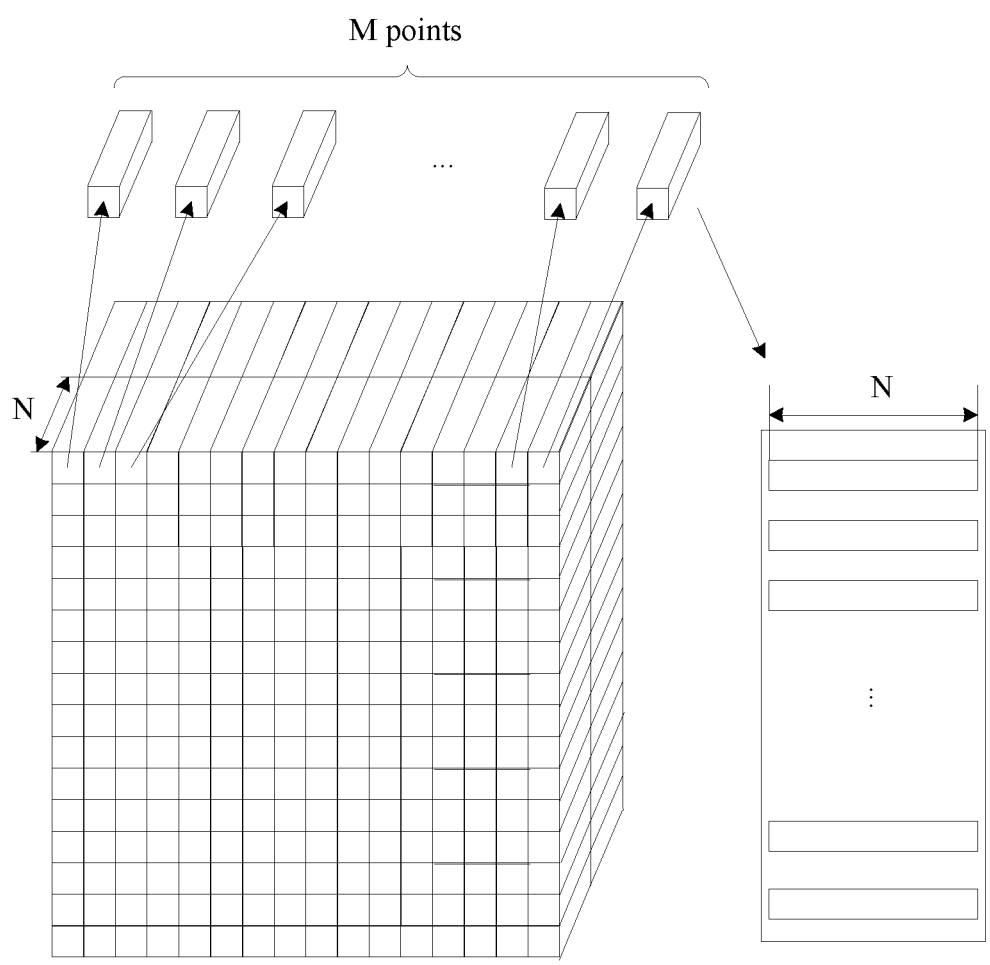
FIG. 3 is a schematic diagram of converting input data into an input matrix in the prior art.

Referring to FIG. 3, based on a stride (stride) (in the embodiments of the present invention, the stride is 1) of the convolution kernel, the operation accelerator may extract N pieces of data of M input points in the direction z, that is, a total of M*N pieces of data. An input matrix (input matrix) may be formed. The operation accelerator needs to perform a multiplication operation on the input matrix and the weight matrix.

The FC operation is substantially a multiplication operation of a vector and a matrix. An input of the FC operation is a vector with 9216 elements, and 4096 points need to be output in FC. In this case, to obtain a point output in FC, a point multiplication operation needs to be performed on a vector with 9216 elements and 9216 weights; and to obtain all 4096 points, a point multiplication operation needs to be performed on the vector of 9216 and 9216×4096 weights.

FIG. 4 shows a calculation formula of a matrix C=A*B, where A is a matrix with dimensions of M*N, and B is a matrix with dimensions of N*K. In the embodiments of the present invention, M, N, and K are positive integers. To obtain one piece of data in the matrix C through calculation, a point multiplication operation needs to be performed on data in a row vector in the matrix A and corresponding data in a column vector in the matrix B, and then addition is performed. In other words, to obtain one piece of data in the matrix C through calculation, N multiplication operations need to be performed. In this case, to obtain the matrix C through calculation, M*N*K multiplication operations need to be performed.

Figure 5:
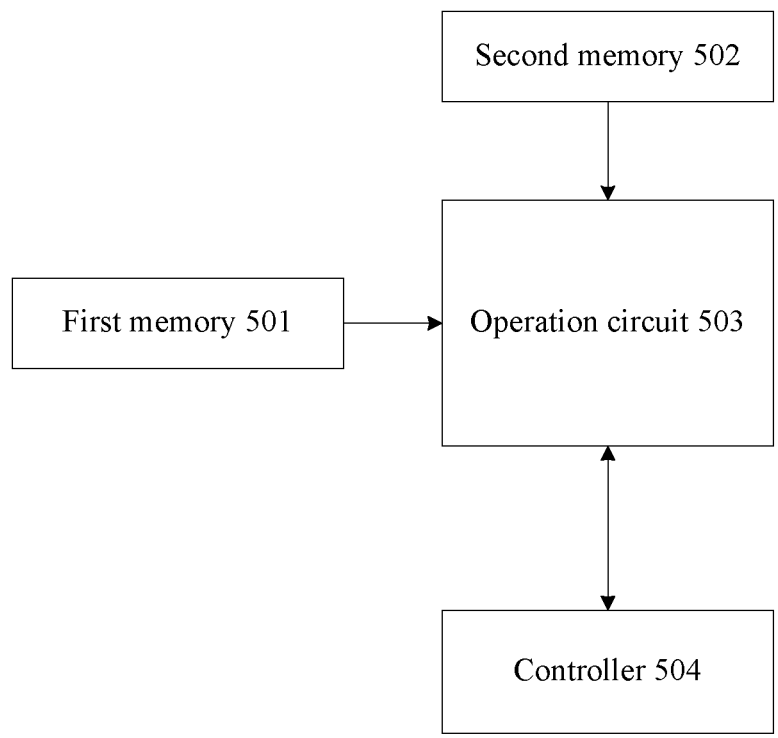
FIG. 5 is a schematic composition diagram of an operation accelerator according to an embodiment of the present invention.

An operation accelerator 50 is provided in an embodiment of the present invention. As shown in FIG. 5, the operation accelerator 50 includes a first memory 501, a second memory 502, an operation circuit 503, and a controller 504. The operation circuit 503 may perform data communication with the first memory 501 and the second memory 502 by using a bus. The operation circuit 503 is configured to: extract matrix data from the first memory 501 and the second memory 502, and perform a multiplication operation. The controller 504 is configured to control, according to a preset program or instruction, the operation circuit 503 to complete the multiplication operation.

The first memory 501 is configured to store a first matrix, and the first matrix is an M*N matrix. If a matrix A is the first matrix, an element in a row i and a column j in the first matrix A may be denoted as $A_{ij}$. The first memory 501 mentioned in this embodiment of the present invention, and the second memory 502, a third memory 506, and a storage unit that are mentioned below each may be a register, a random access memory (random access memory, RAM for short), a static random access memory, a flash memory, or another readable and writable memory.

The second memory 502 is configured to store a second matrix, and the second matrix is an N*K matrix. If a matrix B is the second matrix, an element in a row j and a column g in the second matrix B may be denoted as $B_{jg}$.

M, N, and K are integers greater than 0, i is an integer greater than 0 and less than M+1, g is an integer greater than 0 and less than K+1, and j is an integer greater than 0 and less than N+1. Any two parameters in M, N, and K may be equal, or all M, N, and K may be equal.

Figure 6:
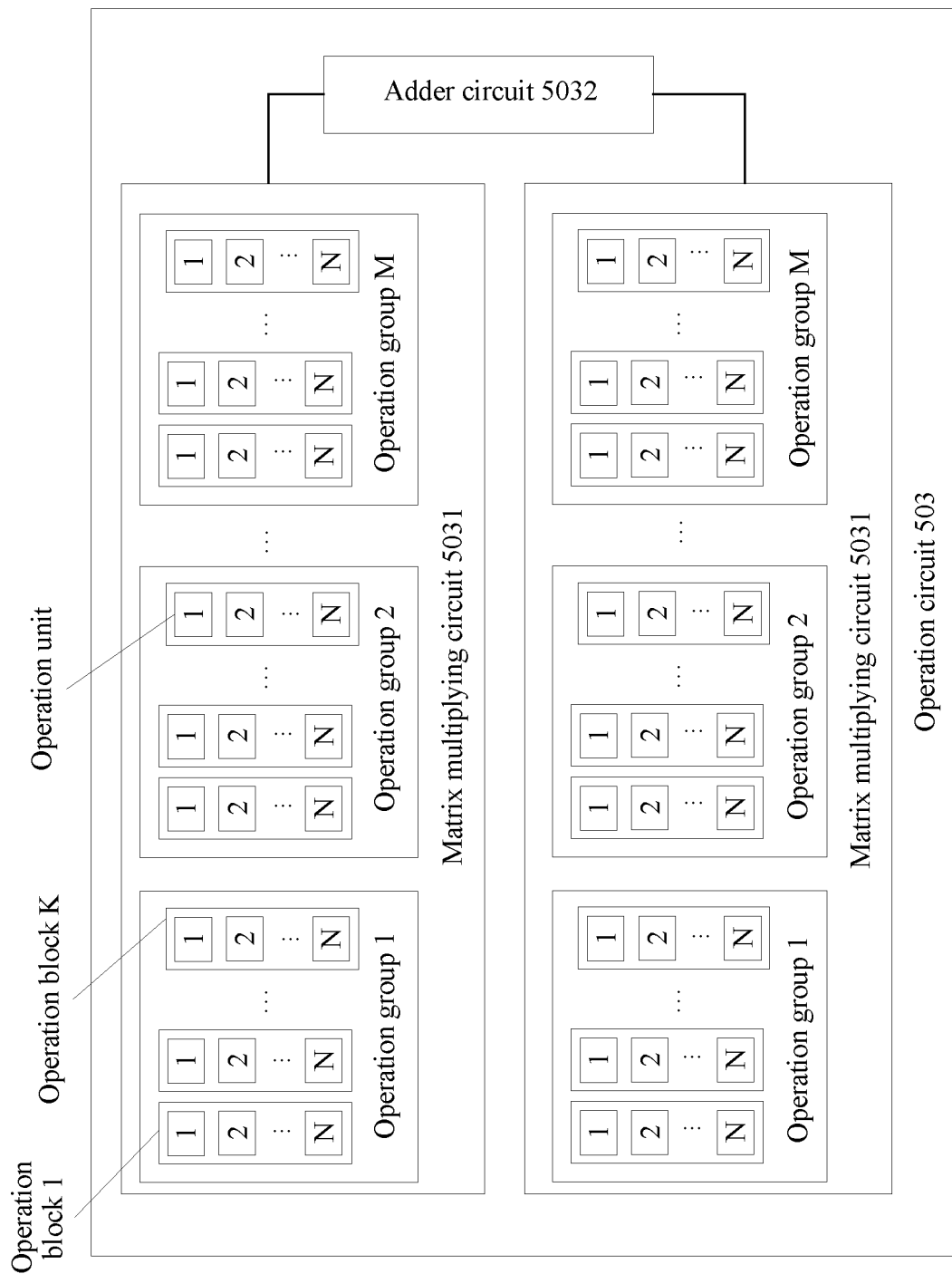
FIG. 6 is a schematic composition diagram of an operation circuit according to an embodiment of the present invention.

As shown in FIG. 6, the operation circuit 503 may include one or more matrix multiplying circuits 5031 and one or more adder circuits 5032. One adder circuit 5032 may be corresponding to one matrix multiplying circuit 5031. One adder circuit 5032 may be alternatively corresponding to a plurality of matrix multiplying circuits 5031. The plurality of matrix multiplying circuits 5031 included in the operation circuit 503 may independently perform respective matrix multiplication operations. FIG. 6 is drawn by using an example in which the operation circuit 503 includes two matrix multiplying circuits 5031. The matrix multiplying circuit 5031 includes M operation groups including operation blocks, each operation group includes K operation blocks, each operation block includes N operation units, the operation unit is provided with two inputs that are respectively used to receive data sent by the first memory and the second memory, and the operation unit multiplies the two pieces of data together. The adder circuit 5032 is configured to add calculation results of operation units belonging to a same operation block to obtain a calculation result of each operation block.

The controller 504 may perform the following actions to calculate a product of the first matrix and the second matrix:

respectively writing K column vectors of the second matrix into the K operation blocks of each operation group, where a $j^{th}$ piece of data in a $g^{th}$ column of vectors of the second matrix is written into a $j^{th}$ operation unit in a $g^{th}$ operation block in each operation group, and the operation circuit 503 may read, under control of the controller 504, data in the second matrix in the second memory 502 and buffer the data in the second matrix into the K operation blocks of each operation group, or the controller 504 may control the second memory 502 to write data in the second matrix into the K operation blocks of each operation group in the operation circuit 503;

respectively sending M row vectors of the first matrix to the M operation groups, where an $i^{th}$ row vector of the first matrix is sent to an $i^{th}$ operation group in the M operation groups, a $j^{th}$ operation unit in each operation block in the $i^{th}$ operation group receives a $j^{th}$ piece of data in the $i^{th}$ row vector, and the operation circuit 503 may read, under control of the controller 504, data in the first matrix in the first memory 501, or the controller 504 may control the first memory 501 to send data in the first matrix to the M operation groups in the operation circuit 503; and so that each operation unit in the M operation groups performs a multiplication operation on two pieces of data received by the operation unit, and the adder circuit 5032 adds calculation results of operation units in each operation block to obtain a third matrix, where the third matrix is the product of the first matrix and the second matrix, an element in a row i and a column g in the third matrix is a calculation result of a $g^{th}$ operation block in the $i^{th}$ operation group.

Optionally, the first memory 501 is connected to the operation circuit 503 by using a first bus, and a bit width of the first bus is $W_i*N*M$. The second memory 502 is connected to the operation circuit 503 by using a second bus, and a bit width of the second bus is $W_i*N$. $W_i$ is a maximum bit width that is of input data and that is allowed by the operation unit.

Specifically, $W_i$ may be set based on a type of the input data of the operation unit. For example, data of an int (integer) 8 type has a bit width of 8 bits, data of an fp (floating point quantity) 16 type has a bit width of 16 bits, data of an fp32 type has a bit width of 32 bits, or the like. A bit width that is of output data and that is allowed by the operation unit may be set based on a range of the calculation result of the operation unit, or may be determined in another manner. For example, when the operation accelerator 50 is configured to calculate a product of an input matrix and a weight matrix, data in the input matrix and data in the weight matrix are both of the int8 type, and an output result of the operation unit may also be set to the int8 type. In this case, the bit width of the output data is equal to the bit width of the input data. Certainly, the output data of the operation unit may be converted into the int16 type. In this case, the bit width of the output data is 16 bits. In addition, the bit width of the output data may be alternatively designed based on another actual requirement.

Figure 7:
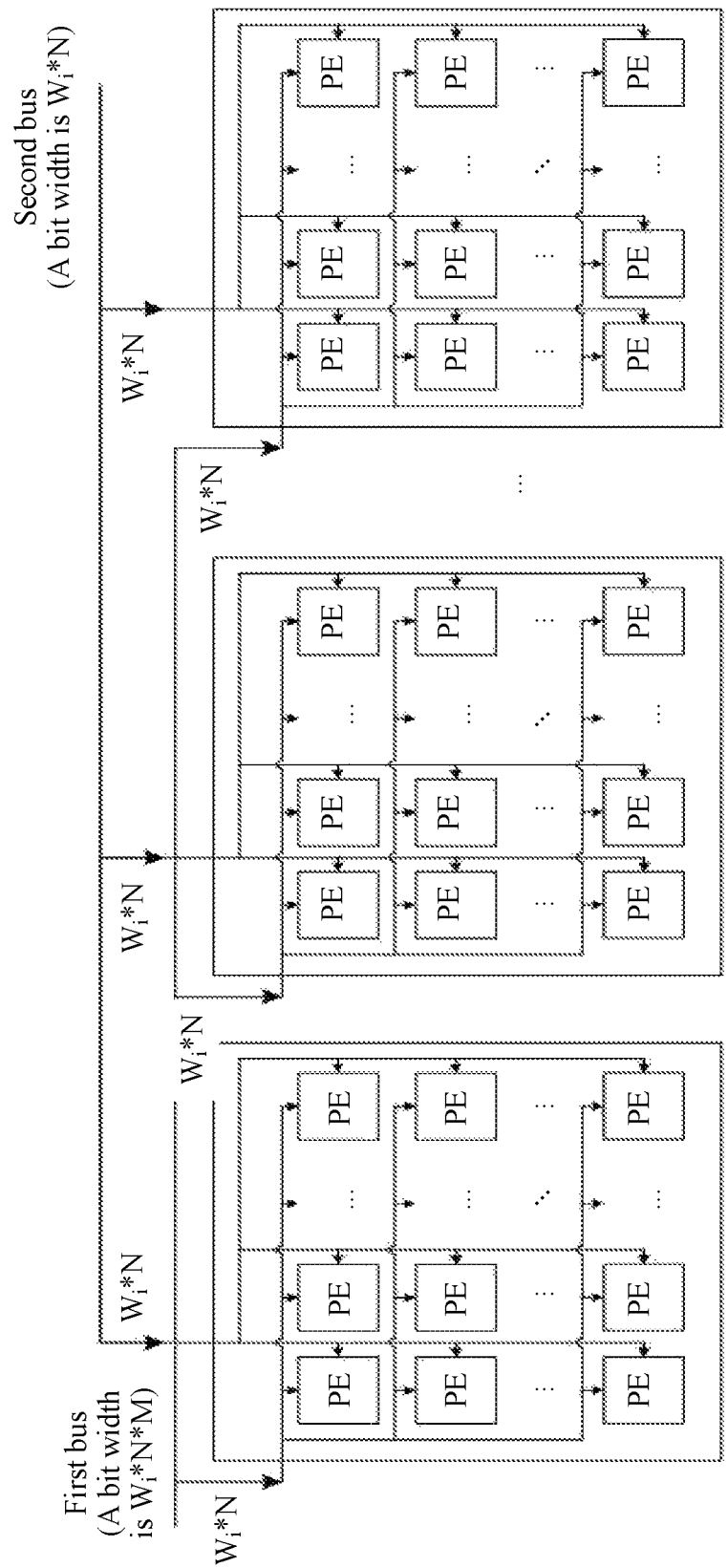
FIG. 7 is a schematic diagram of wiring in an operation circuit according to an embodiment of the present invention.

Specifically, based on an arrangement manner of the operation blocks and the operation units in the operation circuit 503 shown in FIG. 6, FIG. 7 is a schematic diagram of specific wiring in the operation circuit 503.

It can be learned based on the foregoing embodiment that, the operation circuit 503 includes M*N*K operation units. Referring to FIG. 6 and FIG. 7, these operation units are classified into M operation groups, each operation group includes N*K operation units, the N*K operation units are arranged in K columns to form K operation blocks, and each operation block includes N operation units.

Before formally performing the matrix multiplication operation, the operation accelerator 50 needs to load the data in the second matrix to the M operation groups in advance. Because a same second matrix is used for all the operation groups, the second memory 502 may load the data in the second matrices through broadcasting.

Figure 8:
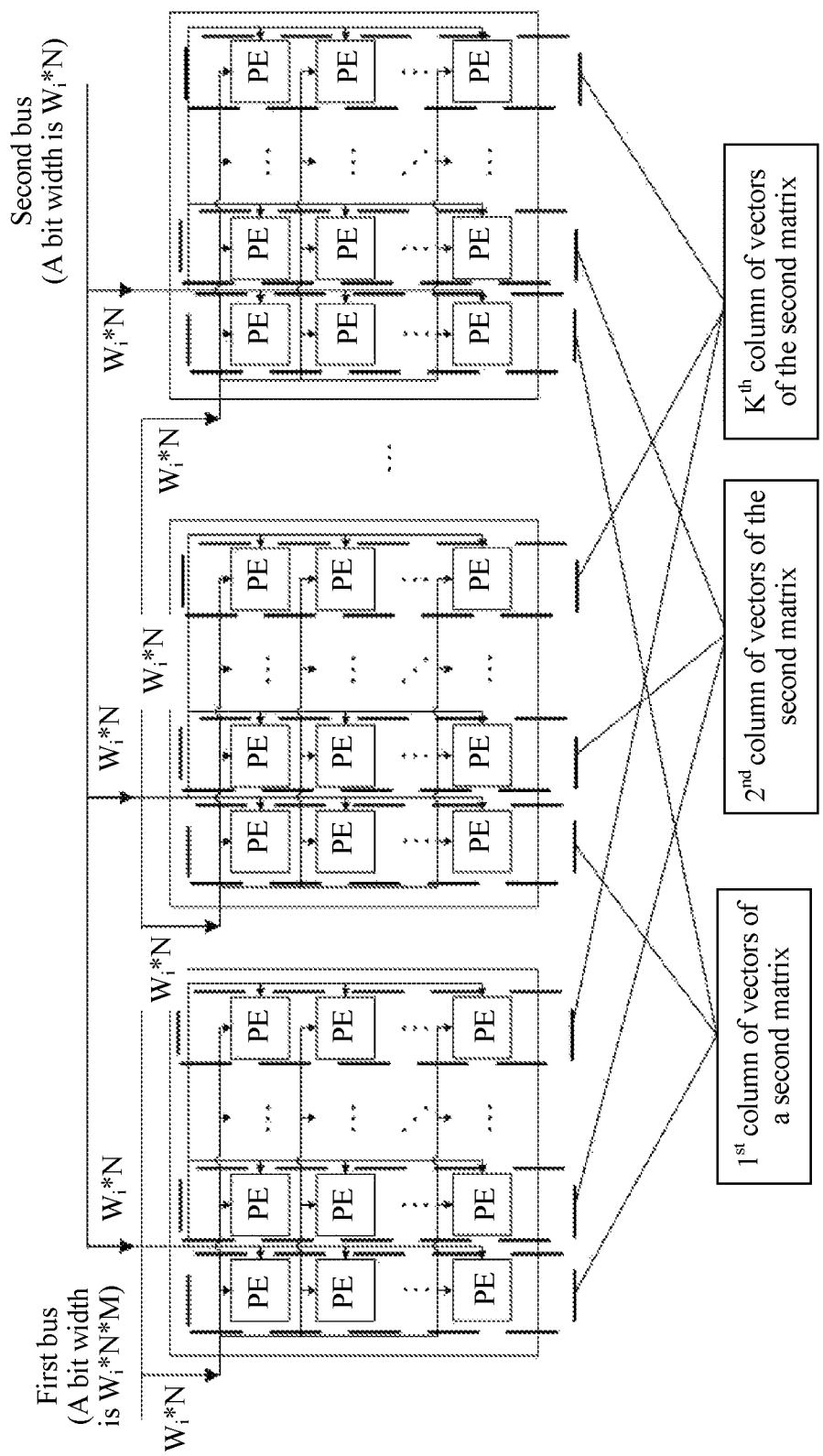
FIG. 8 is a schematic diagram of a column vector loaded in each operation block according to an embodiment of the present invention.

Referring to FIG. 7, there is a second bus whose bit width is $W_i*N$ between the operation circuit 503 and the second memory 502 ($W_i$ is a maximum bit width that is of the input data and that is allowed by the operation unit, and N is a quantity of operation units in one operation block, and in this case, a width of the second bus is $W_i*N$), and the second bus is configured to: broadcast data, and perform column vector broadcasting on one operation block in the M operation groups each time. Specifically, one column vector in the second matrix may be duplicated in M copies first, and then the M copies of column vectors are broadcast to corresponding operation blocks in the M operation groups. For a column vector loaded in each operation block, refer to FIG. 8. If the second memory 502 needs one cycle (the cycle may be a clock cycle that is set based on a specific clock signal, or may be a processing cycle that is generated based on another control signal) to broadcast one column vector, K cycles are required to complete broadcasting of all column vectors in the second matrix.

For example, based on the arrangement manner of the operation blocks in the operation groups shown in FIG. 6, if the matrix B is the second matrix, it is assumed that the second matrix B is:

$$B = \begin{bmatrix} B_{11} & B_{12} & B_{13} & B_{14} \\ B_{21} & B_{22} & B_{23} & B_{24} \\ B_{31} & B_{32} & B_{33} & B_{34} \\ B_{41} & B_{42} & B_{43} & B_{44} \\ B_{51} & B_{52} & B_{53} & B_{54} \end{bmatrix}.$$

Figure 9:
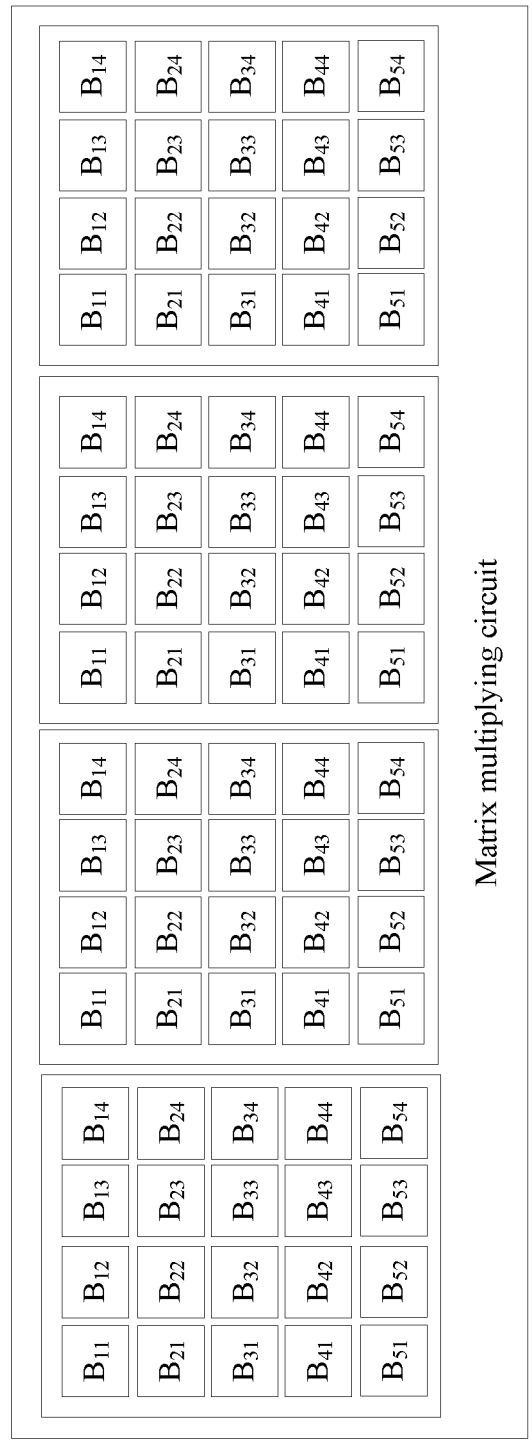
FIG. 9 is a schematic diagram of data in an operation unit in each operation group according to an embodiment of the present invention.

In this case, N=5, and K=4. For data in the operation units after four column vectors in the second matrix B are respectively written into four operation blocks in the four operation groups, refer to FIG. 9.

Figure 10:
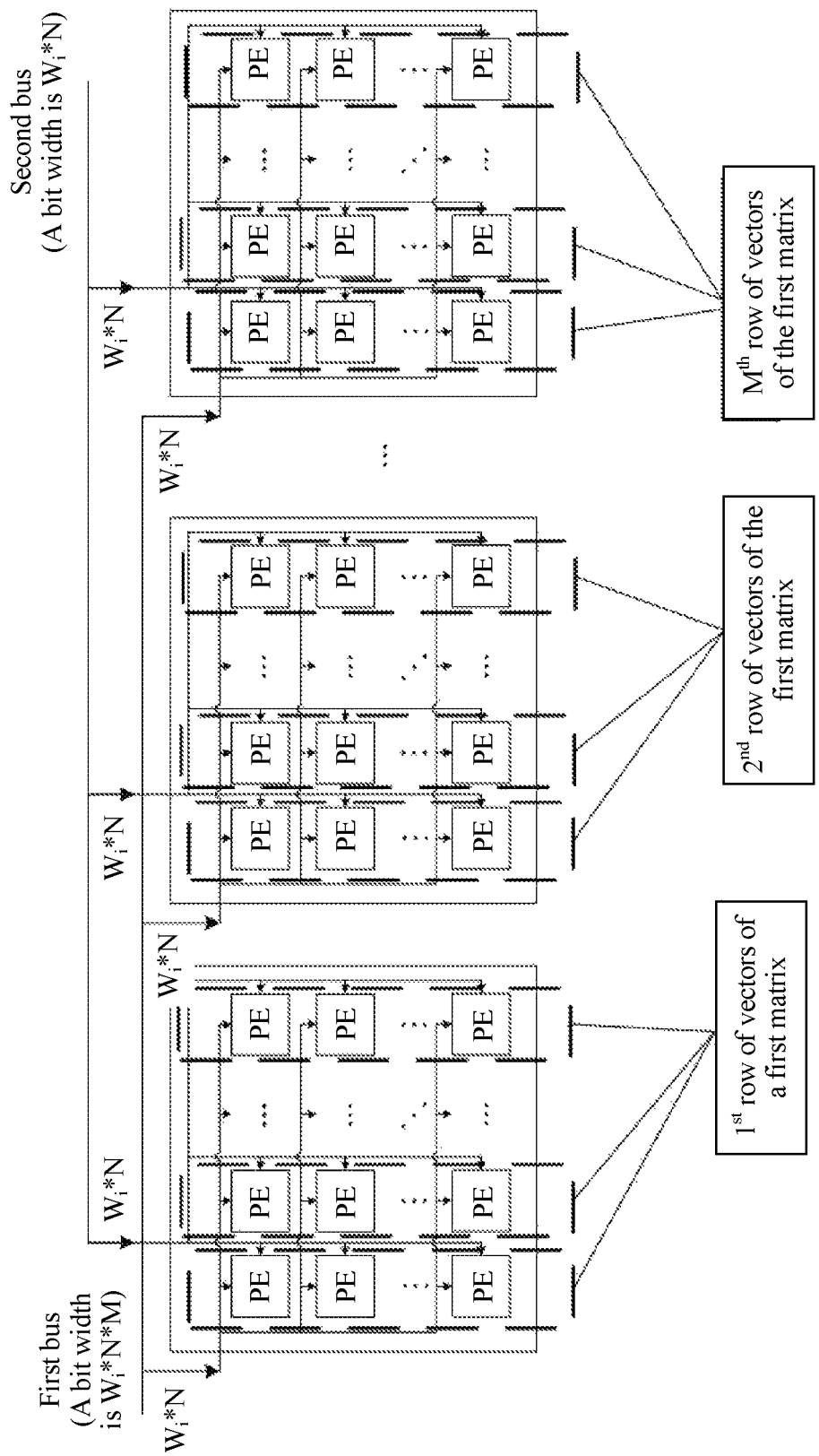
FIG. 10 is a schematic diagram of a row vector loaded in each operation block according to an embodiment of the present invention.

There is a first bus whose bit width is $W_i*N*M$ between the operation circuit 503 and the first memory 501 ($W_i$ is a maximum bit width that is of the input data and that is allowed by the operation unit, N is a quantity of operation units in one operation block, and M is a quantity of operation groups, and in this case, a width of the first bus is $W_i*N*M$), and the first bus is configured to send the data in the first matrix. A bit width of data input into each operation group is $W_i*N$. Each operation group receives one row vector in the first matrix, row vectors received by all operation blocks in each operation group at the same time are the same, and row vectors received by the operation groups are different. Specifically, a row vector that is in the first matrix and that is to be sent to an operation group may be duplicated in K copies in the operation group, and the K copies of row vectors are respectively sent to K operation blocks in the operation group. For a row vector loaded in each operation block, refer to FIG. 10. Because operation units in one row in each operation group use same data, the first memory 501 may send data to the operation units through row broadcasting. Because there are a total of M operation groups, a matrix whose dimensions are M*N may be sent within one cycle.

For example, based on the arrangement manner of the operation blocks in the operation groups shown in FIG. 6, if the matrix A is the first matrix, it is assumed that the first matrix A is:

$$A = \begin{bmatrix} A_{11} & A_{12} & A_{13} & A_{14} & A_{15} \\ A_{21} & A_{22} & A_{23} & A_{24} & A_{25} \\ A_{31} & A_{32} & A_{33} & A_{34} & A_{35} \\ A_{41} & A_{42} & A_{43} & A_{44} & A_{45} \end{bmatrix}.$$

Figure 11:
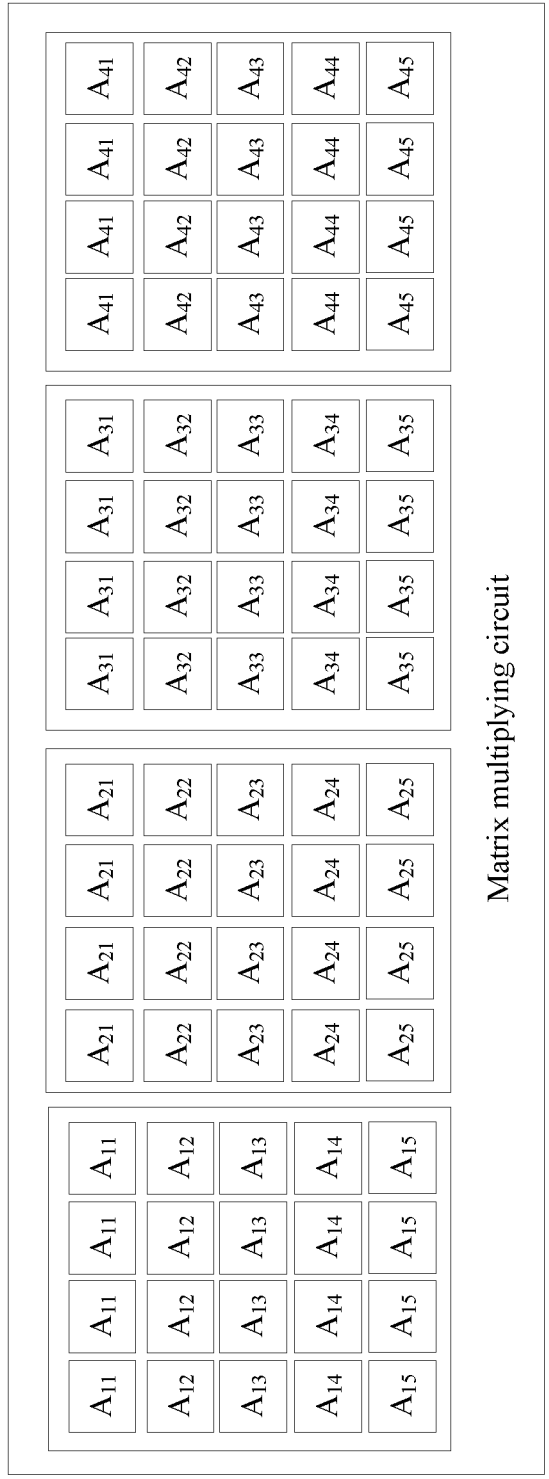
FIG. 11 is a schematic diagram of data in an operation unit in each operation group according to an embodiment of the present invention.
Figure 12:
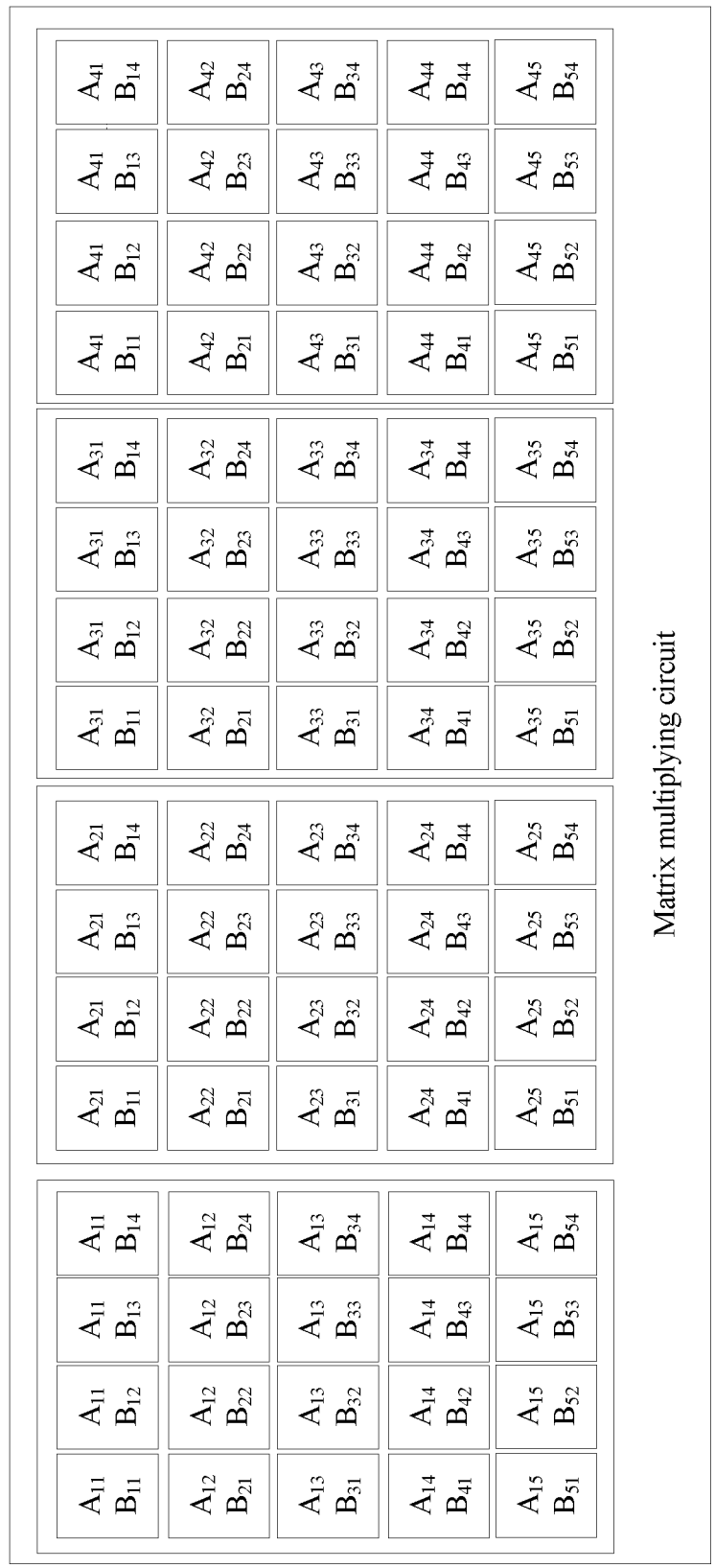
FIG. 12 is a schematic diagram of data calculated by an operation unit in each operation group according to an embodiment of the present invention.

In this case, M=4, and N=5. For data in the operation units after four row vectors in the second matrix A are respectively sent to the four operation groups, refer to FIG. 11. For the data calculated by the operation units in the four operation groups, refer to FIG. 12. Calculation results of the operation units in each operation block are added to obtain the product of the first matrix A and the second matrix B, namely, the third matrix C.

When the method provided in this embodiment of the present invention is applied to a convolutional neural network, the first matrix may be an input matrix, and the second matrix may be a weight matrix.

In the method provided in this embodiment of the present invention, because the M operation groups include M*N*K operation units, the operation accelerator may perform M*N*K multiplication operations within one clock cycle. In this case, the operation accelerator 50 may calculate a product of an M*N matrix and an N*K matrix. Compared with the prior art, this method can greatly reduce time required by the matrix multiplication operation.

Optionally, when one matrix multiplying circuit 5031 is corresponding to one adder circuit 5032, the adder circuit 5032 includes M*K adder trees, one adder tree is corresponding to one operation block, the adder tree is connected to N operation units in the corresponding operation block, and the adder tree is configured to add calculation results of the N operation units connected to the adder tree.

Figure 13:
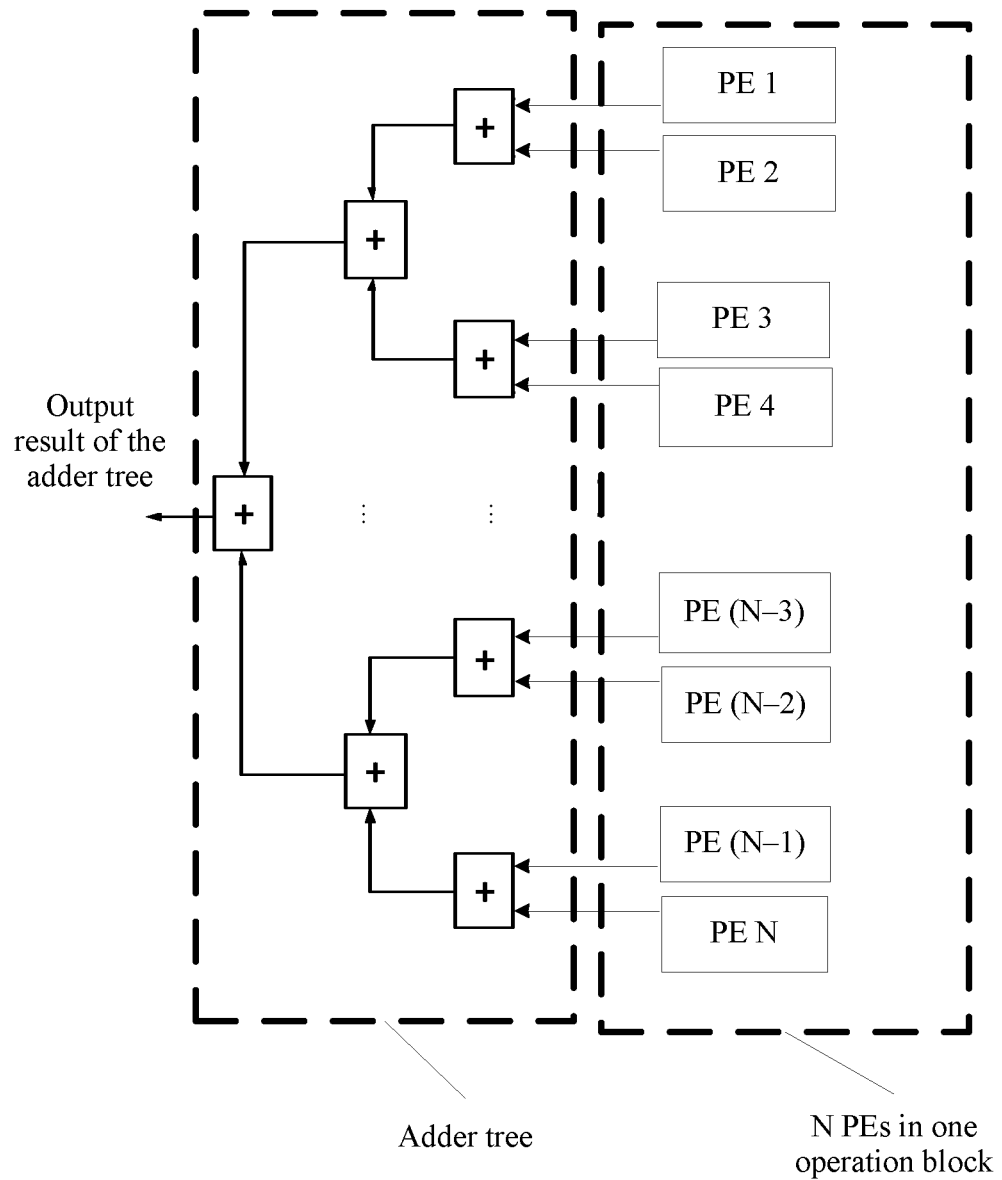
FIG. 13 is a schematic diagram of a relationship between an adder tree and an operation block according to an embodiment of the present invention.

It should be noted that accumulate operations need to be performed for calculation results of all the N operation units in the operation block, so that a calculation result of the operation block can be obtained. Accumulate operations may be specifically performed on calculation results of all operation units in one operation block by using adder trees shown in FIG. 13. The adder tree is substantially a combination of a series of adders, and a connection manner is shown in FIG. 13. In this case, because the adder tree needs to add the calculation results of the N operation units, a bit width of an output result of the adder tree is denoted by $W_a$, and $W_a$ depends on a range of the output result of the adder tree. If a bit width of a calculation result of each operation unit is $W_o$, the output result of the operation blocks that is obtained after the adder tree performs accumulation may exceed a maximum range that can be indicated by $W_o$.

Therefore, a larger bit width usually needs to be used to indicate the output result of the operation block. For example, a maximum bit width of the input data of the operation unit is 8 bits, and a bit width of the output data of the adder tree may be set to 32 bits.

Alternatively, one adder circuit 5032 may be corresponding to a plurality of matrix multiplying circuits 5031. In one case, one matrix multiplying circuit 5031 may be corresponding to M*K adder trees, and the M*K adder trees corresponding to the plurality of matrix multiplying circuits 5031 may be deployed in one adder circuit 5032. Referring to FIG. 6, the adder circuit 5032 included in the operation circuit 503 shown in FIG. 6 is corresponding to two matrix multiplying circuits 5031. In this case, the adder circuit 5032 includes 2*M*K adder trees, M*K of the 2*M*K adder trees are configured to add calculation results output by operation units in M*K operation blocks in one of the two matrix multiplying circuits 5031, the other M*K adder trees of the 2*M*K adder trees are configured to add calculation results output by operation units in M*K operation blocks in the other matrix multiplying circuit 5031 in the two matrix multiplying circuits 5031.

Figure 14:
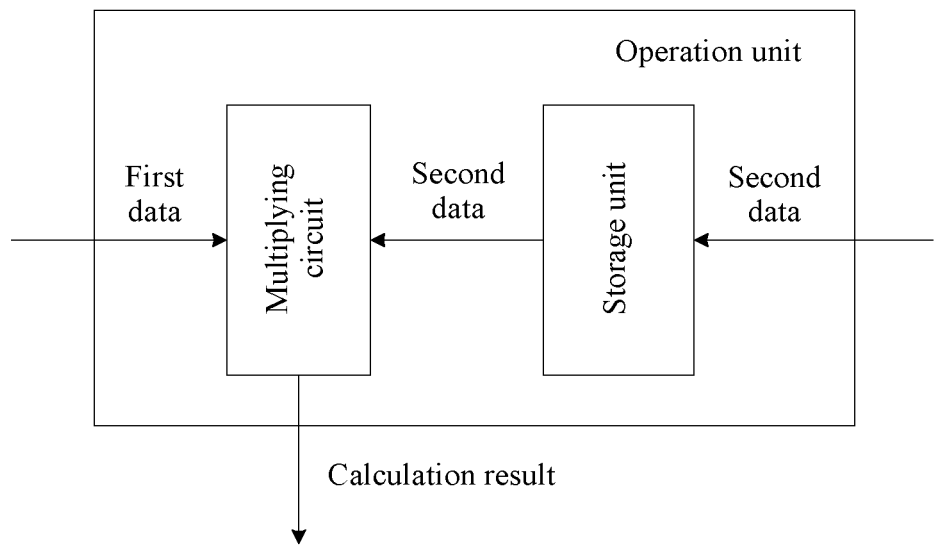
FIG. 14 is a schematic composition diagram of an operation unit according to an embodiment of the present invention.

In one case, referring to FIG. 14, the operation unit includes: a storage unit, configured to store data written into the storage unit; and a multiplying circuit connected to the storage unit, configured to calculate a product of received data and the data stored in the storage unit. Specifically, for ease of description, the data in the first matrix in the operation unit is referred to as "first data", and the data in the second matrix is referred to as second data. In this case, referring to FIG. 14, the storage unit may be configured to store the second data. The multiplying circuit may further include an interface configured to input the first data and the second data and output a calculation result. The storage unit may further include an interface configured to write the second data.

Figure 15:
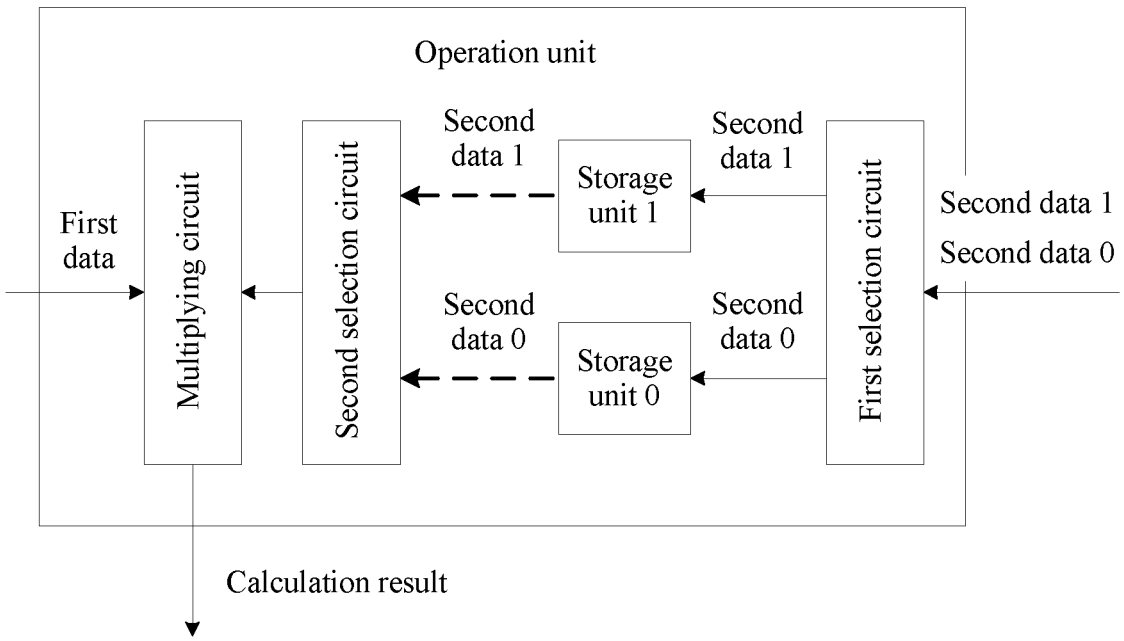
FIG. 15 is a schematic composition diagram of another operation unit according to an embodiment of the present invention.

In another case, referring to FIG. 15, the operation unit includes a plurality of storage units (FIG. 15 is drawn by using an example in which the operation unit includes two storage units), a multiplying circuit, a first selection circuit connected to the plurality of storage units, and a second selection circuit connected to the plurality of storage units and the multiplying circuit.

The plurality of storage units are configured to store data.

The first selection circuit is configured to: before the multiplying circuit performs a multiplication operation, select, from the plurality of storage units, a storage unit for storing data used when the multiplying circuit performs the multiplication operation.

The second selection circuit is configured to: when the multiplying circuit performs the multiplication operation, select a storage unit for storing data used when the multiplying circuit performs the multiplication operation.

The multiplying circuit is configured to calculate a product of received data and the data stored in the storage unit selected by the second selection circuit.

Specifically, the plurality of storage units may store data in different matrices. The first selection circuit may select a storage unit in which data in a matrix is to be stored.

The storage unit may be divided into two blocks (block). When the operation unit includes a plurality of storage units, if the operation unit performs a multiplication operation based on data in one block in one storage unit, the controller 504 may further write data into another storage unit in the plurality of storage units or another block in the storage unit that participates in the multiplication operation, thereby improving work efficiency of the operation unit.

Referring to FIG. 15, if the matrix multiplying circuit 5031 needs to calculate the product of the first matrix A and the second matrix B, and further needs to calculate a product of the first matrix A and a matrix D, the controller 504 may write data in both the second matrix B and the matrix D into the storage units of the operation unit. The first selection circuit may choose to write second data 0 in the second matrix B into a storage unit 0, and write second data 1 in the matrix D into a storage unit 1. When the multiplying circuit performs a multiplication operation on the first data and the second data 0, the second selection circuit chooses to output the second data 0 in the storage unit 0 to the multiplying circuit, and when the multiplying circuit performs a multiplication operation on the first data and the second data 1, the second selection circuit chooses to output the second data 1 in the storage unit 1 to the multiplying circuit.

In this case, each operation unit receives four inputs: the first data, the second data, and two register selection signals. One register selection signal is used to control the first selection circuit to select, from the plurality of storage units before the multiplying circuit performs a multiplication operation, a storage unit for storing data used when the multiplying circuit performs the multiplication operation. The other register selection signal is used to control the second selection circuit to select, when the multiplying circuit performs a multiplication operation, a storage unit for storing data used when the multiplying circuit performs the multiplication operation.

Figure 16:
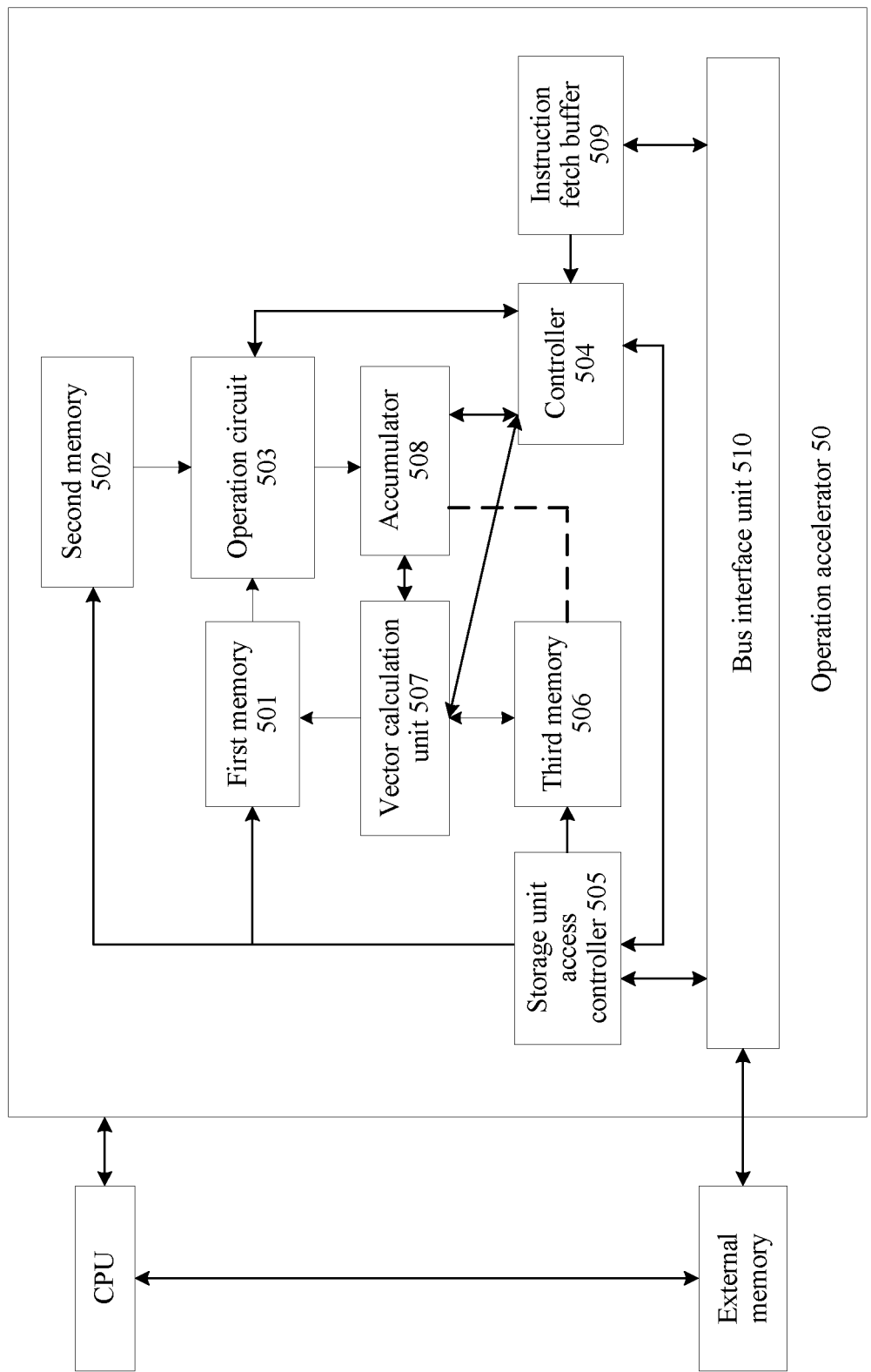
FIG. 16 is a schematic composition diagram of another operation accelerator according to an embodiment of the present invention.

Optionally, referring to FIG. 16, the operation accelerator 50 may further include a storage unit access controller 505 connected to the first memory 501, the second memory 502, and the controller 504.

The storage unit access controller 505 is configured to: obtain, under control of the controller 504, the first matrix and the second matrix, save the first matrix to the first memory 501, and save the second matrix to the second memory 502.

The storage unit access controller 505 may be a direct memory access controller 504 (Direct Memory Access Controller, DMAC for short) or a load/storage unit.

Optionally, referring to FIG. 16, the operation accelerator 50 may further include:

a third memory 506, configured to store source data of the first matrix;

a storage unit access controller 505 connected to the first memory 501, the second memory 502, the third memory 506, and the controller 504, where the storage unit access controller 505 is configured to: obtain, under control of the controller 504, the source data of the first matrix and the second matrix, save the source data of the first matrix to the third memory 506, and save the second matrix to the second memory 502; and a vector calculation unit (vector unit) 507 connected to the first memory 501, the third memory 506, and the controller 504, where the vector calculation unit 507 is configured to: convert, under control of the controller 504, the source data of the first matrix into the first matrix, and save the first matrix to the first memory 501.

Specifically, in an application scenario, data obtained by the storage unit access controller 505 is not directly the first matrix. In this case, the storage unit access controller 505 may save the obtained data (that is, the source data of the first matrix) to the third memory 506. The vector calculation unit 507 may convert the source data of the first matrix in the third memory 506 to obtain the first matrix.

For example, if the operation accelerator 50 requires the first matrix to be a 4 matrix, and the source data of the first matrix to be a 4*4 matrix, the vector calculation unit 507 may pad (padding) the source data of the first matrix with a row vector in which all data is 0, to obtain the first matrix. For example, if the source data of the first matrix is $$\begin{bmatrix} 2 & 3 & 4 & 1 \\ 2 & 5 & 4 & 5 \\ 4 & 5 & 5 & 5 \\ 4 & 7 & 9 & 1 \end{bmatrix},$$

the first matrix is $$\begin{bmatrix} 2 & 3 & 4 & 1 \\ 2 & 5 & 4 & 5 \\ 4 & 5 & 5 & 5 \\ 4 & 7 & 9 & 1 \\ 0 & 0 & 0 & 0 \end{bmatrix}.$$

For another example, if the operation accelerator 50 requires the first matrix to be a 2*4 matrix, and the source data of the first matrix to be a 4*4 matrix, the vector calculation unit 507 may determine, as the first matrix, a matrix including first two rows of vectors in the source data of the first matrix. For example, if the source data of the first matrix is $$\begin{bmatrix} 2 & 3 & 4 & 1 \\ 2 & 5 & 4 & 5 \\ 4 & 5 & 5 & 5 \\ 4 & 7 & 9 & 1 \end{bmatrix},$$

the first matrix is $$\begin{bmatrix} 2 & 3 & 4 & 1 \\ 2 & 5 & 4 & 5 \end{bmatrix}.$$

Figure 17:
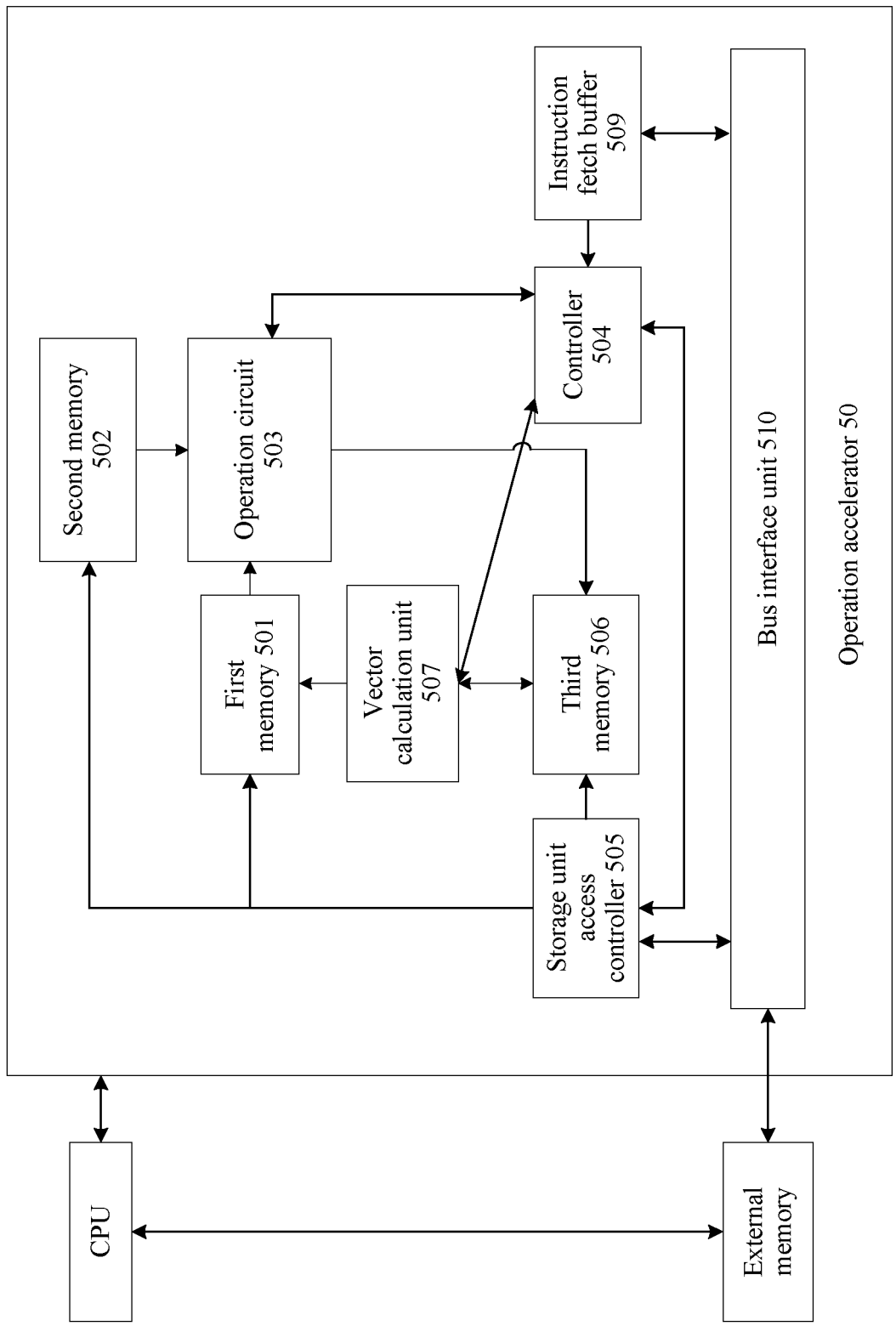
FIG. 17 is a schematic composition diagram of still another operation accelerator according to an embodiment of the present invention.

In a case, referring to FIG. 17, the third memory 506 is connected to the operation circuit 503, and the third memory 506 is further configured to store the third matrix. In this case, the third memory 506 may be further connected to the operation circuit 503 by using an accumulator 508 below. The operation circuit 503 may output the calculation result to the accumulator 508. The accumulator 508 may save the third matrix to the third memory.

In another case, referring to FIG. 16, the operation accelerator 50 further includes an accumulator 508 connected to the operation circuit 503, the vector calculation unit 507, and the controller 504.

The accumulator 508 is configured to add elements at corresponding positions in the third matrix and a fourth matrix under control of the controller 504, to obtain a fifth matrix.

The vector calculation unit 507 is further configured to save the fifth matrix to the third memory 506 under control of the controller 504.

The third matrix is the product of the first matrix and the second matrix, the first matrix includes a first part of a first to-be-calculated matrix, the first part of the first to-be-calculated matrix is elements in $1^{st}$ to $N^{th}$ columns of the first to-be-calculated matrix, the second matrix is a first part of a second to-be-calculated matrix, the first part of the second to-be-calculated matrix is elements in $1^{st}$ to $N^{th}$ rows of the second to-be-calculated matrix, the first to-be-calculated matrix includes M rows of elements, the second to-be-calculated matrix includes K columns of elements, the fourth matrix is a product of a second part of the first to-be-calculated matrix and a second part of the second to-be-calculated matrix, the second part of the first to-be-calculated matrix is a part other than the first part in the first to-be-calculated matrix, and the second part of the second to-be-calculated matrix is a part other than the first part in the second to-be-calculated matrix.

It should be noted that the operation accelerator 50 provided in this embodiment of the present invention may calculate a product of an M*N matrix and an N*K matrix. However, in an actual operation, dimensions of a matrix that needs to be calculated may be larger or smaller than M*N and N*K. When the dimensions of the matrix that needs to be calculated are larger than M*N and N*K, each time the operation accelerator 50 performs calculation, only a partial result of a final result of a product of the two matrices that need to be calculated can be obtained, a plurality of loop iterations are further required, and partial results are added, so as to obtain the product of the two matrices that need to be calculated.

Substantially, after the matrices that need to be calculated are transformed to some extent, the operation accelerator 50 provided in this embodiment of the present invention may perform a multiplication operation on two matrices with any row quantity and column quantity. A specific implementation is as follows:

If the operation accelerator 50 needs to calculate a product of a Q*R matrix and an R*T matrix, the following two cases occur:

Case 1: Q is less than M, R is less than N, and T is less than K.

In this case, the Q*R matrix may be reshaped to an M*N matrix through padding, the R*T matrix may be reshaped to an N*K matrix through padding, and then the operation accelerator 50 provided in this embodiment of the present invention is used to perform a matrix multiplication operation. A specific padding method is to pad with elements 0 around a matrix, so that the matrix changes to a matrix with a required row quantity and column quantity. For example, when M=N=8, FIG. 18 shows an example of separately reshaping a 4*5 matrix and a 5*8 matrix to an 8*8 matrix through padding.

Case 2: Q is greater than M, or R is greater than N, or T is greater than K.

In this case, when Q is greater than M or R is greater than N, the Q*R matrix needs to be partitioned into an M*N matrix, and before the partitioning, the Q*R matrix needs to be reshaped, through padding, to a matrix whose row quantity is a multiple of M and whose column quantity is a multiple of N. When R is greater than N or T is greater than K, the R*T matrix needs to be partitioned into an N*K matrix, and before the partitioning, the R*T matrix needs to be reshaped, through padding, to a matrix whose row quantity is a multiple of N and whose column quantity is a multiple of K.

It is assumed that the row quantity of the Q*R matrix is twice M, the column quantity of the Q*R matrix is twice N, the row quantity of the R*T matrix is twice N, and the column quantity of the R*T matrix is twice K. The Q*R matrix may be partitioned into four M*N matrices, denoted as $$\begin{bmatrix} A1 & B1 \\ C1 & D1 \end{bmatrix},$$

where A1, B1, C1, and D1 each are an M*N matrix. The R*T matrix may be partitioned into four N*K matrices, denoted as $$\begin{bmatrix} A2 & B2 \\ C2 & D2 \end{bmatrix},$$

where A2, B2, C2, and D2 each are an N*K matrix. A product S of the Q*R matrix and the R*T matrix is $$\begin{bmatrix} A1 & B1 \\ C1 & D1 \end{bmatrix}\begin{bmatrix} A2 & B2 \\ C2 & D2 \end{bmatrix} = \begin{bmatrix} A1A2+B1C2 & A1B2+B1D2 \\ C1A2+D1C2 & C1B2+D1D2 \end{bmatrix}.$$

The matrix S may be obtained by calculating a product of $$\begin{bmatrix} A1 & B1 \\ C1 & D1 \end{bmatrix} \text{ and } \begin{bmatrix} A2 & B2 \\ C2 & D2 \end{bmatrix}.$$

To calculate the product of $$\begin{bmatrix} A1 & B1 \\ C1 & D1 \end{bmatrix} \text{ and } \begin{bmatrix} A2 & B2 \\ C2 & D2 \end{bmatrix},$$

eight multiplication operations of the M*N matrix and the N*K matrix need to be completed. The eight multiplication operations of the M*N matrix and the N*K matrix are A1A2, B1C2, A1B2, B1D2, C1A2, D1C2, C1B2, and D1D2. The eight matrix multiplication operations may be completed by configuring eight matrix multiplying circuits 5031 in the operation circuit 503, or may be completed by no more than eight matrix multiplying circuits 5031 in the operation circuit 503. For example, two matrix multiplying circuits 5031 each complete four matrix multiplication operations to complete the eight matrix multiplication operations.

After the eight matrix multiplication operations are completed, it can be learned from $$S = \begin{bmatrix} A1 & B1 \\ C1 & D1 \end{bmatrix}\begin{bmatrix} A2 & B2 \\ C2 & D2 \end{bmatrix} = \begin{bmatrix} A1A2+B1C2 & A1B2+B1D2 \\ C1A2+D1C2 & C1B2+D1D2 \end{bmatrix}$$

that, A1A2 and B1C2 are added to obtain an element in a first row and a first column of the matrix S, A1B2 and B1D2 are added to obtain an element in the first row and a second column of the matrix S, C1A2 and D1C2 are added to obtain an element in a second row and the first column of the matrix S, and C1B2 and D1D2 are added to obtain an element in the second row and the second column of the matrix S. A1A2 and B1C2 are used as an example. A1A2 and B1C2 each are an M*K matrix. Therefore, elements at corresponding positions in A1A2 and B1C2 are added, and then an element in the first row and the first column of the matrix S (the row and the column of the matrix S herein are a row and a column indicated by $$\begin{bmatrix} A1A2+B1C2 & A1B2+B1D2 \\ C1A2+D1C2 & C1B2+D1D2 \end{bmatrix})$$

can be obtained.

Specifically, a calculation result of a product of any two elements in $$\begin{bmatrix} A1 & B1 \\ C1 & D1 \end{bmatrix} \text{ and } \begin{bmatrix} A2 & B2 \\ C2 & D2 \end{bmatrix}$$

may be stored in the accumulator 508. The accumulator 508 performs an addition operation on calculation results to obtain the matrix S.

That the Q*R matrix and the R*T matrix are partitioned into four matrices is used as an example for description in the foregoing. Actually, the Q*R matrix and the R*T matrix may be partitioned into two, six, or eight matrices, or the like. A calculation principle is the same as that described above. Details are not described herein again.

For example, it is assumed that M=N=K=3 (in this case, because neither of the row quantity and the column quantity of the matrix A is three, and neither of the row quantity and the column quantity of the matrix B is three, the matrix A is not the first matrix, and the matrix B is not the second matrix). To calculate a product of a matrix $$A = \begin{bmatrix} A_{11} & A_{12} & A_{13} & A_{14} & A_{15} \\ A_{21} & A_{22} & A_{23} & A_{24} & A_{25} \\ A_{31} & A_{32} & A_{33} & A_{34} & A_{35} \\ A_{41} & A_{42} & A_{43} & A_{44} & A_{45} \end{bmatrix}$$

and a matrix $$B = \begin{bmatrix} B_{11} & B_{12} & B_{13} & B_{14} \\ B_{21} & B_{22} & B_{23} & B_{24} \\ B_{31} & B_{32} & B_{33} & B_{34} \\ B_{41} & B_{42} & B_{43} & B_{44} \\ B_{51} & B_{52} & B_{53} & B_{54} \end{bmatrix},$$

because the matrix A is a 4*5 matrix, the matrix A needs to be reshaped, through padding, to a matrix $$A = \begin{bmatrix} A_{11} & A_{12} & A_{13} & A_{14} & A_{15} & 0 \\ A_{21} & A_{22} & A_{23} & A_{24} & A_{25} & 0 \\ A_{31} & A_{32} & A_{33} & A_{34} & A_{35} & 0 \\ A_{41} & A_{42} & A_{43} & A_{44} & A_{45} & 0 \\ 0 & 0 & 0 & 0 & 0 & 0 \\ 0 & 0 & 0 & 0 & 0 & 0 \end{bmatrix},$$

and because the matrix B is a 5*4 matrix, the matrix B needs to be reshaped, through padding, to a matrix $$B = \begin{bmatrix} B_{11} & B_{12} & B_{13} & B_{14} & 0 & 0 \\ B_{21} & B_{22} & B_{23} & B_{24} & 0 & 0 \\ B_{31} & B_{32} & B_{33} & B_{34} & 0 & 0 \\ B_{41} & B_{42} & B_{43} & B_{44} & 0 & 0 \\ B_{51} & B_{52} & B_{53} & B_{54} & 0 & 0 \\ 0 & 0 & 0 & 0 & 0 & 0 \end{bmatrix}.$$

Referring to FIG. 19, the matrix A and the matrix B may be separately partitioned into four 3*3 matrices. In this case, eight multiplication operations of 3*3 matrices need to be performed to calculate the product of the matrix A and the matrix B. The eight multiplication operations of 3*3 matrices are: A1A2, B1C2, A1B2, B1D2, C1A2, D1C2, C1B2, and D1D2. A calculation result of A1A2 is $$\begin{bmatrix} A_{11}B_{11}+A_{12}B_{21}+A_{13}B_{31} & A_{11}B_{12}+A_{12}B_{22}+A_{13}B_{32} & A_{11}B_{13}+A_{12}B_{23}+A_{13}B_{33} \\ A_{21}B_{11}+A_{22}B_{21}+A_{23}B_{31} & A_{21}B_{12}+A_{22}B_{22}+A_{23}B_{32} & A_{21}B_{13}+A_{22}B_{23}+A_{23}B_{33} \\ A_{31}B_{11}+A_{32}B_{21}+A_{33}B_{31} & A_{31}B_{12}+A_{32}B_{22}+A_{33}B_{32} & A_{31}B_{13}+A_{32}B_{23}+A_{33}B_{33} \end{bmatrix},$$

and after the calculation result of A1A2 is obtained, the result is stored in the accumulator 508. A calculation result of B1C2 is $$\begin{bmatrix} A_{14}B_{41}+A_{15}B_{51}+0 & A_{14}B_{42}+A_{15}B_{52}+0 & A_{14}B_{43}+A_{15}B_{53}+0 \\ A_{24}B_{41}+A_{25}B_{51}+0 & A_{24}B_{42}+A_{25}B_{52}+0 & A_{24}B_{43}+A_{25}B_{53}+0 \\ A_{34}B_{41}+A_{35}B_{51}+0 & A_{34}B_{42}+A_{35}B_{52}+0 & A_{34}B_{43}+A_{35}B_{53}+0 \end{bmatrix},$$

and after the calculation result of B1C2 is obtained, the result is stored in the accumulator 508. The accumulator 508 adds elements at corresponding positions in A1A2 and B1C2 to obtain $$\begin{bmatrix} A_{11}B_{11}+A_{12}B_{21}+A_{13}B_{31}+A_{14}B_{41}+A_{15}B_{51} & A_{11}B_{12}+A_{12}B_{22}+A_{13}B_{32}+A_{14}B_{42}+A_{15}B_{52} & A_{11}B_{13}+A_{12}B_{23}+A_{13}B_{33}+A_{14}B_{43}+A_{15}B_{53} \\ A_{21}B_{11}+A_{22}B_{21}+A_{23}B_{31}+A_{24}B_{41}+A_{25}B_{51} & A_{21}B_{12}+A_{22}B_{22}+A_{23}B_{32}+A_{24}B_{42}+A_{25}B_{52} & A_{21}B_{13}+A_{22}B_{23}+A_{23}B_{33}+A_{24}B_{43}+A_{25}B_{53} \\ A_{31}B_{11}+A_{32}B_{21}+A_{33}B_{31}+A_{34}B_{41}+A_{35}B_{51} & A_{31}B_{12}+A_{32}B_{22}+A_{33}B_{32}+A_{34}B_{42}+A_{35}B_{52} & A_{31}B_{13}+A_{32}B_{23}+A_{33}B_{33}+A_{34}B_{43}+A_{35}B_{53} \end{bmatrix},$$

$$\begin{bmatrix} A_{11}B_{11}+A_{12}B_{21}+A_{13}B_{31}+A_{14}B_{41}+A_{15}B_{51} & A_{11}B_{12}+A_{12}B_{22}+A_{13}B_{32}+A_{14}B_{42}+A_{15}B_{52} & A_{11}B_{13}+A_{12}B_{23}+A_{13}B_{33}+A_{14}B_{43}+A_{15}B_{53} \\ A_{21}B_{11}+A_{22}B_{21}+A_{23}B_{31}+A_{24}B_{41}+A_{25}B_{51} & A_{21}B_{12}+A_{22}B_{22}+A_{23}B_{32}+A_{24}B_{42}+A_{25}B_{52} & A_{21}B_{13}+A_{22}B_{23}+A_{23}B_{33}+A_{24}B_{43}+A_{25}B_{53} \\ A_{31}B_{11}+A_{32}B_{21}+A_{33}B_{31}+A_{34}B_{41}+A_{35}B_{51} & A_{31}B_{12}+A_{32}B_{22}+A_{33}B_{32}+A_{34}B_{42}+A_{35}B_{52} & A_{31}B_{13}+A_{32}B_{23}+A_{33}B_{33}+A_{34}B_{43}+A_{35}B_{53} \end{bmatrix}$$

namely, data in a common area of the first three rows and the first three columns of the product of the matrix A and the matrix B. Data at other positions of the product of the matrix A and the matrix B is calculated in the same way. Details are not described herein again.

The vector calculation unit 507 may include M*K operation units. The vector calculation unit 507 may perform further processing such as vector multiplication, vector addition, exponential operation, logarithm operation, or magnitude comparison on data output by the accumulator 508 when necessary. For example, the vector calculation unit 507 may be specifically configured to perform network calculation of a non-convolution/non-FC layer in the convolutional neural network, such as pooling (pooling), batch normalization (batch normalization), or local response normalization (local response normalization). It should be noted that referring to FIG. 16, if the vector calculation unit 507 does not perform further processing on the data output by the accumulator 508, the accumulator 508 may directly save the fifth matrix to the third memory 506.

Optionally, referring to FIG. 16 and FIG. 17, the operation accelerator 50 may further include:

an instruction fetch buffer (instruction fetch buffer) 509 connected to the controller 504, configured to store an instruction used by the controller 504; and a bus interface unit 510 (Bus Interface Unit, BIU for short) connected to the instruction fetch buffer 509, the storage unit access controller 505, and an external memory, used by the instruction fetch buffer 509 to obtain the instruction from the external memory, and further used by the storage unit access controller 505 to obtain at least one of the source data of the first matrix, the first matrix, and the second matrix from the external memory.

Specifically, referring to FIG. 16 and FIG. 17, the operation accelerator 50 provided in this embodiment of the present invention may be used as a coprocessor mounted to a central processing unit (Central Processing Unit, CPU for short), and the CPU allocates a calculation task to the operation accelerator 50. Specifically, the CPU may store the first matrix, the second matrix, and the instruction in the external memory. The operation accelerator 50 may complete a matrix multiplication operation by reading the first matrix, the second matrix, and the instruction from the external memory. The external memory may be specifically a double data rate synchronous dynamic random access memory (Double Data Rate Synchronous Dynamic Random Access Memory, DDR for short) or another readable and writable memory. The external memory may be a memory private to the operation accelerator 50. Specifically, the first memory 501, the second memory 502, the third memory 506, and the instruction fetch buffer 509 are usually on-chip buffers (On-Chip Buffer).

Figure 20:
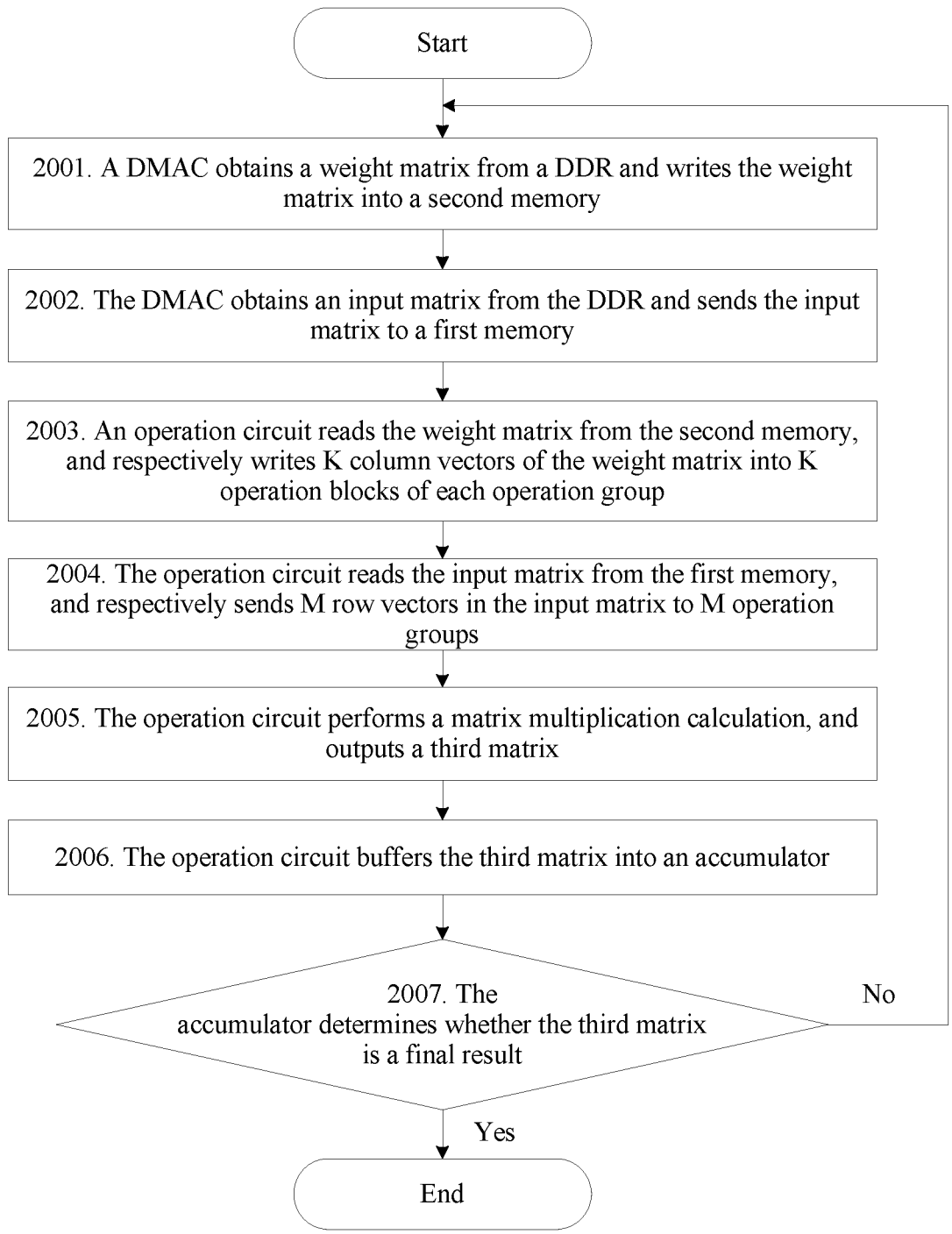
FIG. 20 is a flowchart in which a controller controls an operation accelerator to complete a matrix multiplication operation according to an embodiment of the present invention.

For example, the operation accelerator 50 is applied to the convolutional neural network. Referring to FIG. 20, a process in which the controller 504 in the operation accelerator 50 controls the operation accelerator 50 to complete calculation of the product of the weight matrix and the input matrix may specifically include the following steps.

2001. The DMAC obtains the weight matrix from the DDR and writes the weight matrix into the second memory 502.

2002. The DMAC obtains the input matrix from the DDR and sends the input matrix to the first memory 501.

2003. The operation circuit 503 reads the weight matrix from the second memory 502, and respectively writes the K column vectors of the weight matrix into the K operation blocks of each operation group.

2004. The operation circuit 503 reads the input matrix from the first memory 501, and respectively sends the M row vectors in the input matrix to the M operation groups.

2005. The operation circuit 503 performs a matrix multiplication calculation, and outputs the third matrix.

The third matrix is the product of the weight matrix and the input matrix.

2006. The operation circuit 503 buffers the third matrix into the accumulator 508.

2007. The accumulator 508 determines whether the third matrix is a final result.

If yes, the process ends. If no, go back to step 2001.

For specific implementations of the foregoing steps and related explanations, refer to the descriptions above. Details are not described herein again. The operation accelerator 50 needs to complete step 2001 to step 2004 before formally starting the matrix multiplication operation. An execution sequence of step 2001 to step 2004 does not need to be strictly subject to FIG. 20, and it only needs to be ensured that step 2003 is after step 2001, step 2004 is after step 2002, and step 2005 is after step 2004.

Figure 21:
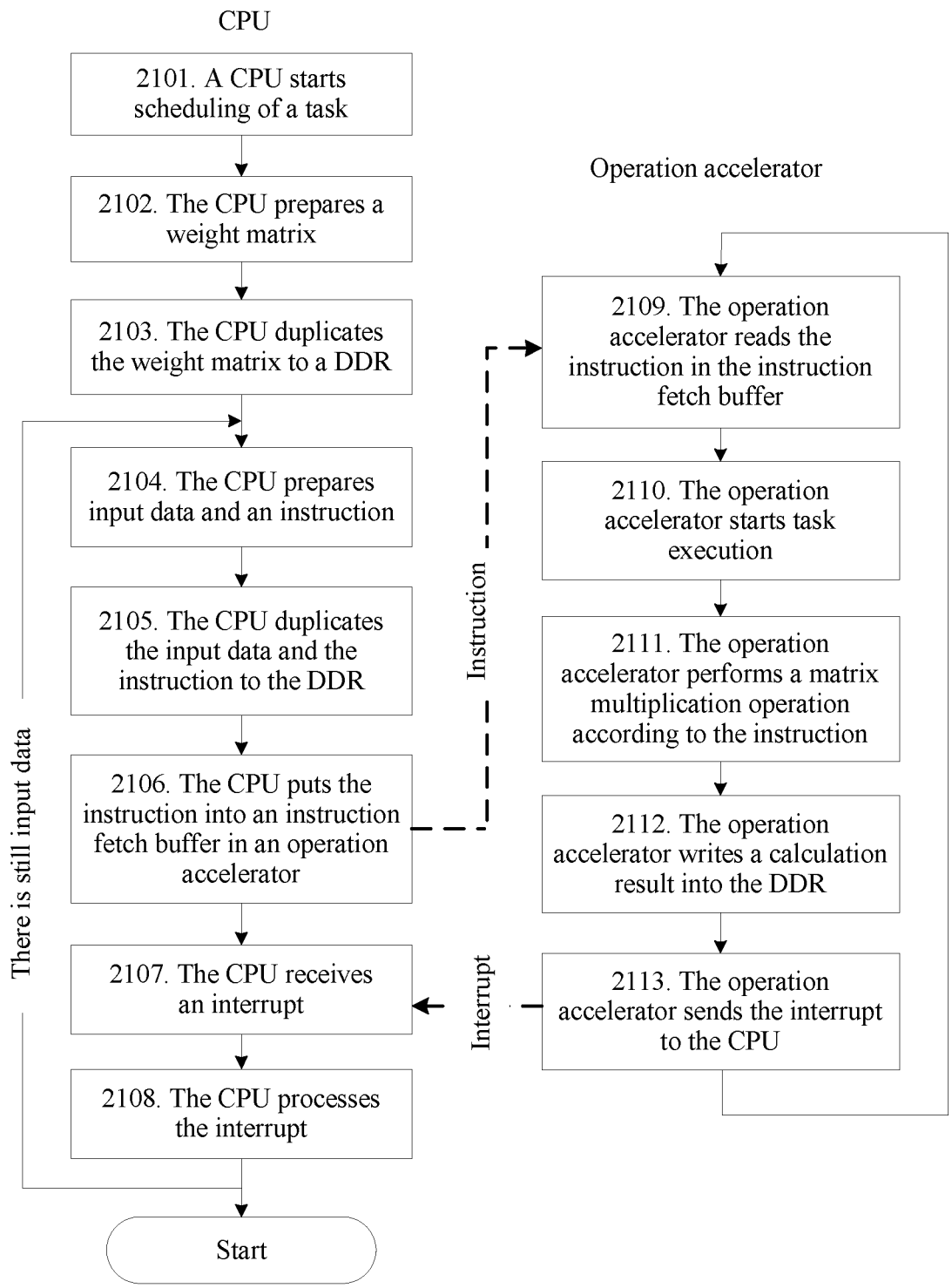
FIG. 21 is a flowchart in which a CPU controls an operation accelerator to implement a matrix multiplication operation according to an embodiment of the present invention.

The operation accelerator 50 may be used as a coprocessor mounted to the CPU. Therefore, a process in which the CPU controls the operation accelerator 50 to implement the matrix multiplication operation is briefly described. As shown in FIG. 21, the process may specifically include the following steps.

2101. The CPU starts scheduling of a task.

The task is a matrix multiplication operation task.

2102. The CPU prepares a weight matrix.

2103. The CPU duplicates the weight matrix to the DDR.

2104. The CPU prepares input data and an instruction.

2105. The CPU duplicates the input data and the instruction to the DDR.

2106. The CPU puts the instruction into the instruction fetch buffer 509 in the operation accelerator 50.

After this step, the CPU performs actions 2107 and 2108, and the operation accelerator 50 performs actions 2109 to 2113.

2107. The CPU receives an interrupt.

The interrupt is an interrupt sent to the CPU after the operation accelerator 50 performs the matrix multiplication operation to obtain a calculation result and writes the calculation result into the DDR, and the interrupt is used by the CPU to process the calculation result.

2108. The CPU processes the interrupt.

If there is still input data, go back to step 2104. If there is no input data, the process ends.

2109. The operation accelerator 50 reads the instruction from the instruction fetch buffer 509.

2110. The operation accelerator 50 starts task execution.

2111. The operation accelerator 50 performs the matrix multiplication operation according to the instruction.

2112. The operation accelerator 50 writes a calculation result into the DDR.

2113. The operation accelerator 50 sends the interrupt to the CPU.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions can be stored in a computer readable storage medium or transmitted from one computer readable storage medium to another computer readable storage medium. For example, the computer instructions can be transmitted from one website, computer, server, or data center to another website, computer, server, or data center in a wired (for example, a coaxial cable, a fiber optic, or a digital subscriber line (Digital Subscriber Line, DSL for short)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state disk (Solid State Disk, SSD for short)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "an" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An operation accelerator, comprising:
a first memory, configured to store a first matrix, wherein the first matrix is an M*N matrix;
a second memory, configured to store a second matrix, wherein the second matrix is an N*K matrix;
an operation circuit connected to the first memory and the second memory, wherein the operation circuit comprises:
a matrix multiplying circuit that comprises M operation groups, each operation group comprises K operation blocks, each operation block comprises N operation units that are configured to receive two pieces of data, one each respectively from the first memory and the second memory and further configured to multiply the two pieces of data; and
an adder circuit configured to add calculation results of operation units belonging to a same operation block to obtain a calculation result of each operation block; and
a controller connected to the operation circuit, wherein the controller is configured to perform the following actions:
respectively write K column vectors of the second matrix into the K operation blocks of each operation group, wherein a $j^{th}$ piece of data in a $g^{th}$ column of vectors of the second matrix is written into a $j^{th}$ operation unit in a $g^{th}$ operation block in the K operation blocks;
respectively send M row vectors of the first matrix to the M operation groups, wherein an $i^{th}$ row vector of the first matrix is sent to an $i^{th}$ operation group in the M operation groups, and a $j^{th}$ operation unit in each operation block in the $i^{th}$ operation group receives a $j^{th}$ piece of data in the $i^{th}$ row vector; and
so that the adder circuit adds calculation results of operation units in each operation block to obtain a third matrix that is a product of the first matrix and the second matrix, and
wherein:
an element in a row i and a column g in the third matrix is a calculation result of a $g^{th}$ operation block in the $i^{th}$ operation group,
M, N, and K are integers greater than 0,
i is an integer greater than 0 and less than M+1,
g is an integer greater than 0 and less than K+1, and
j is an integer greater than 0 and less than N+1.

2. The operation accelerator according to claim 1, wherein the adder circuit comprises M*K adder trees, each adder tree of the M*K adder trees is corresponding to one operation block, the each adder tree is connected to N operation units in the corresponding operation block, and the each adder tree is configured to add calculation results of the N operation units connected to the each adder tree.

3. The operation accelerator according to claim 1, wherein the operation unit comprises:

a storage unit, configured to store a second data, wherein the second data is the data from the second matrix; and a multiplying circuit connected to the storage unit, configured to calculate a product of a first data and the second data stored in the storage unit, wherein the first data is the data from the first matrix.

4. The operation accelerator according to claim 1, wherein the operation unit comprises a plurality of storage units, a multiplying circuit, a first selection circuit connected to the plurality of storage units, and a second selection circuit connected to the plurality of storage units and the multiplying circuit, wherein the plurality of storage units are configured to store data;

the first selection circuit is configured to: before the multiplying circuit performs a multiplication operation, select, from the plurality of storage units, a storage unit for storing data used when the multiplying circuit performs the multiplication operation;

the second selection circuit is configured to: when the multiplying circuit performs the multiplication operation, select a storage unit for storing data used when the multiplying circuit performs the multiplication operation; and the multiplying circuit is configured to calculate a product of received data and the data stored in the storage unit selected by the second selection circuit.

5. The operation accelerator according to claim 1, wherein the first memory is connected to the operation circuit by using a first bus, and a bit width of the first bus is $W_i*N*M$; the second memory is connected to the operation circuit by using a second bus, and a bit width of the second bus is $W_i*N$; and $W_i$ is a maximum bit width that is of input data and that is allowed by the operation unit.

6. The operation accelerator according to claim 1, wherein the operation accelerator further comprises a storage unit access controller connected to the first memory, the second memory, and the controller, wherein the storage unit access controller is configured to: obtain, under control of the controller, the first matrix and the second matrix, save the first matrix to the first memory, and save the second matrix to the second memory.

7. The operation accelerator according to claim 1, wherein the operation accelerator further comprises:

a third memory, configured to store source data of the first matrix;

a storage unit access controller connected to the first memory, the second memory, the third memory, and the controller, wherein the storage unit access controller is configured to: obtain, under control of the controller, the source data of the first matrix and the second matrix, save the source data of the first matrix to the third memory, and save the second matrix to the second memory; and a vector calculation unit connected to the first memory, the third memory, and the controller, wherein the vector calculation unit is configured to: convert, under control of the controller, the source data of the first matrix into the first matrix, and save the first matrix to the first memory.

8. The operation accelerator according to claim 7, wherein the third memory is connected to the operation circuit, and the third memory is further configured to store the third matrix.

9. The operation accelerator according to claim 7, wherein the operation accelerator further comprises an accumulator connected to the operation circuit, the vector calculation unit, and the controller, wherein the accumulator is configured to add elements at corresponding positions in the third matrix and a fourth matrix under control of the controller, to obtain a fifth matrix; and the vector calculation unit is further configured to save the fifth matrix to the third memory under control of the controller, wherein the third matrix is the product of the first matrix and the second matrix, the first matrix comprises a first part of a first to-be-calculated matrix, the first part of the first to-be-calculated matrix is elements in $1^{st}$ to $N^{th}$ columns of the first to-be-calculated matrix, the second matrix is a first part of a second to-be-calculated matrix, the first part of the second to-be-calculated matrix is elements in $1^{st}$ to $N^{th}$ rows of the second to-be-calculated matrix, the first to-be-calculated matrix comprises M rows of elements, the second to-be-calculated matrix comprises K columns of elements, the fourth matrix is a product of a second part of the first to-be-calculated matrix and a second part of the second to-be-calculated matrix, the second part of the first to-be-calculated matrix is a part other than the first part in the first to-be-calculated matrix, and the second part of the second to-be-calculated matrix is a part other than the first part in the second to-be-calculated matrix.

10. The operation accelerator according to claim 1, wherein the operation accelerator further comprises:

an instruction fetch buffer connected to the controller, configured to store an instruction used by the controller; and a bus interface unit connected to the instruction fetch buffer, the storage unit access controller, and an external memory, used by the instruction fetch buffer to obtain the instruction from the external memory, and further used by the storage unit access controller to obtain at least one of the source data of the first matrix, the first matrix, and the second matrix from the external memory.

11. The operation accelerator according to claim 1, wherein the operation accelerator comprises a convolutional neural network, the first matrix is an input matrix and the second matrix is a weight matrix.

12. The operation accelerator according to claim 1, wherein M=N=K.

13. The operation accelerator according to claim 1, wherein any two parameters in M, N, and K are equal.

* * * * *